US010730260B2

(12) United States Patent
Wehrmann

(10) Patent No.: US 10,730,260 B2
(45) **Date of Patent: *Aug. 4, 2020**

(54) WEB AND METHOD FOR MAKING FLUID FILLED UNITS

(75) Inventor: Rick Steven Wehrmann, Hudson, OH (US)

(73) Assignee: Automated Packaging Systems, LLC, Streetsboro, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/036,170

(22) Filed: Feb. 28, 2011

(65) Prior Publication Data

US 2011/0151159 A1 Jun. 23, 2011

Related U.S. Application Data

(60) Division of application No. 11/299,933, filed on Dec. 12, 2005, now Pat. No. 7,897,219, which is a (Continued)

(51) Int. Cl.

| | |
|---|---|
| ***B32B 1/02*** | (2006.01) |
| ***B31D 5/00*** | (2017.01) |
| *B32B 1/08* | (2006.01) |

(52) U.S. Cl.

CPC .... *B31D 5/0073* (2013.01); *B31D 2205/0052* (2013.01); *Y10T 428/13* (2015.01); (Continued)

(58) Field of Classification Search

CPC . B31D 5/0073; Y10T 428/139; Y10T 428/13; Y10T 428/1359; Y10T 428/1334; (Continued)

(56) References Cited

U.S. PATENT DOCUMENTS

| | | | |
|---|---|---|---|
| 892,179 | A | 6/1908 | Parmenter |
| 2,153,214 | A | 4/1939 | Tondrean |

(Continued)

FOREIGN PATENT DOCUMENTS

| | | |
|---|---|---|
| CA | 2428246 | 9/2002 |
| CL | 200201316 | 6/2002 |

(Continued)

OTHER PUBLICATIONS

Office action from U.S. Appl. No. 12/259,419 dated Sep. 16, 2011.

(Continued)

*Primary Examiner* — Marc A Patterson

(74) *Attorney, Agent, or Firm* — Jon M. Isaacson

(57) ABSTRACT

A preformed web and a method of producing dunnage units from the preformed web. The web is an elongate flattened thermoplastic tube having an inflation edge and an opposite edge. The tube includes spaced transverse seals that define sides of pouches. The tube includes lines of perforations that allow adjacent dunnage units to be separated. A starting point of the lines of perforations is spaced apart from the inflation edge. The positions of the starting point of the lines of perforations with respect to the inflation edge is selected such that a cutter that cuts the inflation edge clears the line of perforations. Binding or wrinkling is therefore not caused by engagement of the cutter with the lines of perforations.

9 Claims, 10 Drawing Sheets

Related U.S. Application Data continuation-in-part of application No. 11/194,375, filed on Aug. 1, 2005, now Pat. No. 7,571,584, which is a continuation-in-part of application No. 11/141,304, filed on May 31, 2005, now Pat. No. 7,757,459.

(60) Provisional application No. 60/576,004, filed on Jun. 1, 2004, provisional application No. 60/592,812, filed on Jul. 30, 2004.

(52) U.S. Cl.
CPC ...... *Y10T 428/139* (2015.01); *Y10T 428/1334* (2015.01); *Y10T 428/1352* (2015.01); *Y10T 428/1359* (2015.01); *Y10T 428/1369* (2015.01)

(58) Field of Classification Search
CPC .................. Y10T 428/1352; Y10T 428/1369; B32B 1/02
USPC .................... 428/34.1, 34.2, 35.7, 35.9, 36.9
See application file for complete search history.

(56) References Cited

U.S. PATENT DOCUMENTS 2,379,935 A 7/1945 Seiferth et al.
3,033,257 A 5/1962 Weber
3,254,820 A 6/1966 Lerner
3,254,828 A 6/1966 Lerner
3,298,156 A 1/1967 Lerner
3,340,669 A 9/1967 Farquharson
3,358,823 A * 12/1967 Paxton .................. B65D 31/10 206/390
3,359,703 A 12/1967 Quaadgras
3,389,534 A 6/1968 Pendleton
3,405,020 A 10/1968 Chavannes
3,414,140 A 12/1968 Feldkamp
3,456,867 A 7/1969 Repko
3,462,027 A 8/1969 Puckhaber
3,477,196 A 11/1969 Lerner
3,501,085 A 3/1970 Dohmeier
3,523,055 A 8/1970 Lemelson
3,559,874 A 2/1971 Titchenal
3,575,757 A 4/1971 Smith
3,575,781 A 4/1971 Pezely
3,585,858 A 4/1971 Smith
3,577,305 A 5/1971 Hines et al.
3,597,895 A 8/1971 Jensen
3,616,155 A 10/1971 Chavannes
3,618,286 A 11/1971 Membrino
3,650,877 A 3/1972 Johnson
3,660,189 A 5/1972 Troy
3,667,593 A 6/1972 Pendleton
3,696,580 A 10/1972 Saltzer
3,699,746 A 10/1972 Titchenal
3,730,240 A 5/1973 Presnick
3,744,211 A 7/1973 Titchenal et al.
3,791,573 A 2/1974 Titchenal et al.
3,795,163 A 3/1974 Armstrong et al.
3,802,974 A 4/1974 Emmel
3,808,981 A 5/1974 Shaw
3,813,845 A 6/1974 Weikert
3,817,017 A 6/1974 Titchenal
3,817,803 A 6/1974 Horsley
3,837,990 A 9/1974 McConnell et al.
3,837,991 A 9/1974 Evans et al.
3,855,037 A 12/1974 Imhagen et al.
3,868,056 A 2/1975 Keren
3,938,298 A 2/1976 Luhman et al.
3,939,995 A 2/1976 Baxter
3,941,306 A 3/1976 Weikert
3,960,062 A 6/1976 Leloux
3,939,991 A 9/1976 Evans
4,011,798 A 3/1977 Bambara
4,014,154 A 3/1977 Lerner
4,017,351 A 4/1977 Larson
4,021,283 A 5/1977 Weikert
4,040,526 A 8/1977 Baxter et al.
4,044,693 A 8/1977 Ramsey, Jr.
4,076,872 A 2/1978 Lewicki et al.
4,087,002 A 5/1978 Bambara
4,096,306 A 6/1978 Larson
4,102,364 A 7/1978 Lowdermilk
4,103,471 A 8/1978 Lowdermilk
4,146,069 A 3/1979 Angarola et al.
4,169,002 A 9/1979 Larson
4,201,029 A 5/1980 Lerner
4,214,024 A 7/1980 Jacobson
4,245,796 A 1/1981 Eglinton
4,273,549 A 6/1981 Pezzanna
4,284,221 A 8/1981 Nagel
4,306,656 A 12/1981 Dahlem
4,314,865 A 2/1982 Ottaviano
4,354,004 A 10/1982 Hughes et al.
4,380,484 A 4/1983 Repik et al.
4,493,684 A 1/1985 Bolton
4,498,894 A 2/1985 Kuckhermann
4,514,962 A 5/1985 Ausnit
4,518,654 A 5/1985 Eichbauer
4,545,180 A 10/1985 Chung et al.
4,551,379 A 11/1985 Matarasso
4,564,407 A 1/1986 Tsurata
4,576,669 A 3/1986 Caputo
4,597,244 A 7/1986 Pharo
4,598,421 A 7/1986 Jostler
4,616,472 A 10/1986 Owensby et al.
4,619,635 A 10/1986 Ottaviano
4,631,901 A 12/1986 Chung et al.
4,654,878 A 3/1987 Lems
4,664,577 A 5/1987 Bonali
4,679,688 A 7/1987 Soderholm
4,676,376 A 8/1987 Kerswetter
4,787,755 A 11/1988 Branson
4,793,123 A 12/1988 Pharo
4,847,126 A 7/1989 Hiroshi et al.
4,859,083 A 8/1989 Nocek
4,874,093 A 10/1989 Pharo
4,901,506 A 2/1990 Weyandt
4,904,092 A 4/1990 Campbell et al.
4,918,904 A 4/1990 Pharo
4,922,687 A 5/1990 Chow et al.
4,931,033 A 6/1990 Leeds
4,945,714 A 8/1990 Bodolay et al.
4,969,310 A 11/1990 Lerner et al.
4,981,374 A 1/1991 Rutter et al.
5,034,450 A * 7/1991 Betz ........................ C08L 77/00 524/538
5,041,317 A 8/1991 Greyvenstein
5,045,041 A 9/1991 Murphy
5,060,801 A 10/1991 Vilas-Boas
5,064,408 A 11/1991 Bridgeman
5,070,675 A 12/1991 Chuan-Shiang
5,094,657 A 3/1992 Dworak et al.
5,117,608 A 6/1992 Nease et al.
5,141,494 A 8/1992 Danforth et al.
5,151,494 A 8/1992 Danforth et al.
5,181,614 A 1/1993 Watts
5,187,917 A 2/1993 Mykleby
5,188,691 A 2/1993 Caputo
5,203,761 A 4/1993 Reichental et al.
5,210,993 A 5/1993 van Boxtel
5,216,868 A 6/1993 Cooper et al.
5,257,492 A 11/1993 Watts
5,272,856 A 12/1993 Pharo
5,289,671 A 3/1994 Lerner
5,307,969 A 5/1994 Menendez
5,340,632 A 8/1994 Chappuis
5,351,828 A 10/1994 Becker et al.
5,383,837 A 1/1995 Watts
5,394,676 A 3/1995 Lerner
5,427,294 A 6/1995 VandenHeuvel
5,427,830 A 6/1995 Pharo
5,454,642 A 10/1995 DeLuca
5,468,525 A 11/1995 Watts

(56) References Cited

U.S. PATENT DOCUMENTS

| | | | | |
|---|---|---|---|---|
| 5,470,300 | A | 11/1995 | Terranova | |
| 5,549,233 | A | 8/1996 | Clauser | |
| 5,552,003 | A | 9/1996 | Hoover et al. | |
| 5,651,237 | A | 7/1997 | DeLuca | |
| 5,687,549 | A | 11/1997 | Jostler et al. | |
| 5,693,163 | A | 12/1997 | Hoover et al. | |
| 5,699,653 | A | 12/1997 | Hartman et al. | |
| 5,704,192 | A | 1/1998 | Jostler et al. | |
| 5,722,218 | A | 3/1998 | Lerner | |
| 5,733,045 | A * | 3/1998 | Jostler | B65B 9/08 383/37 |
| 5,743,070 | A | 4/1998 | Lerner | |
| 5,752,666 | A | 5/1998 | Simhaee | |
| 5,755,328 | A | 5/1998 | DeLuca | |
| 5,784,861 | A | 7/1998 | Kotsiopoulos | |
| 5,810,200 | A | 9/1998 | Trokhan | |
| 5,824,392 | A | 10/1998 | Gotoh et al. | |
| 5,826,723 | A | 10/1998 | Jaszai | |
| 5,921,390 | A | 7/1999 | Simhaee | |
| 5,941,053 | A | 8/1999 | Kotsiopoulos | |
| 5,944,424 | A | 8/1999 | Lerner et al. | |
| 5,961,020 | A | 10/1999 | Schmidt | |
| 5,987,856 | A | 11/1999 | Lerner | |
| 5,996,319 | A | 12/1999 | Lerner et al. | |
| RE36,501 | E | 1/2000 | Hoover et al. | |
| 6,010,090 | A | 1/2000 | Bushmaker et al. | |
| 6,015,047 | A | 1/2000 | Greenland | |
| 6,015,357 | A | 1/2000 | Ricci | |
| 6,055,796 | A | 5/2000 | Lerner et al. | |
| RE36,759 | E | 7/2000 | Hoover et al. | |
| 6,116,000 | A | 9/2000 | Perkins et al. | |
| 6,139,188 | A | 10/2000 | Marzano | |
| 6,170,239 | B1 | 1/2001 | Lerner | |
| 6,199,349 | B1 | 3/2001 | Lerner | |
| 6,206,262 | B1 | 3/2001 | Achelphol | |
| 6,209,286 | B1 | 4/2001 | Perkins et al. | |
| 6,213,167 | B1 | 4/2001 | Greenland | |
| 6,228,454 | B1 | 5/2001 | Johnson et al. | |
| 6,282,716 | B1 | 9/2001 | Patterson et al. | |
| 6,367,975 | B1 | 4/2002 | Cronauer et al. | |
| 6,410,119 | B1 | 6/2002 | DeLuca et al. | |
| 6,423,166 | B1 | 7/2002 | Simhaee | |
| 6,431,361 | B1 | 8/2002 | Wolf | |
| 6,447,864 | B2 | 9/2002 | Johnson et al. | |
| 6,460,313 | B1 | 10/2002 | Cooper | |
| 6,488,222 | B1 | 12/2002 | West et al. | |
| 6,499,278 | B2 * | 12/2002 | Cronauer et al. | 53/459 |
| 6,519,916 | B1 | 2/2003 | Brown | |
| 6,527,147 | B2 | 3/2003 | Wehrmann | |
| 6,536,624 | B2 | 3/2003 | Johnson et al. | |
| 6,543,201 | B2 | 4/2003 | Cronauer et al. | |
| 6,550,229 | B2 | 4/2003 | Sperry et al. | |
| 6,565,946 | B2 | 5/2003 | Perkins et al. | |
| 6,569,283 | B1 | 5/2003 | Sperry et al. | |
| 6,582,800 | B2 | 6/2003 | Fuss et al. | |
| 6,609,644 | B1 | 8/2003 | Menna | |
| 6,625,956 | B1 | 9/2003 | Soudan | |
| D480,646 | S | 10/2003 | Borchard et al. | |
| D480,971 | S | 10/2003 | DeLuca et al. | |
| 6,635,145 | B2 | 10/2003 | Cooper | |
| 6,651,406 | B2 | 11/2003 | Sperry et al. | |
| 6,659,150 | B1 | 12/2003 | Perkins et al. | |
| 6,672,037 | B2 | 1/2004 | Wehrmann | |
| 6,696,127 | B1 | 2/2004 | Mitchell, Jr. | |
| D490,711 | S | 6/2004 | DeLuca et al. | |
| 6,742,317 | B2 | 6/2004 | Cronauer et al. | |
| 6,751,926 | B1 | 6/2004 | Cooper | |
| 6,755,568 | B2 | 6/2004 | Malone et al. | |
| 6,761,960 | B2 | 7/2004 | DeLuca et al. | |
| 6,786,022 | B2 | 9/2004 | Fuss et al. | |
| 6,800,162 | B2 | 10/2004 | Kannankeril | |
| 6,871,755 | B2 | 3/2005 | DeVries | |
| 6,889,739 | B2 | 5/2005 | Lerner et al. | |
| 6,899,621 | B2 | 5/2005 | Behm | |
| 6,932,258 | B1 | 8/2005 | Roberts | |
| 6,946,044 | B2 | 9/2005 | Lörsch | |
| 6,948,296 | B1 | 9/2005 | Lerner et al. | |
| 6,952,910 | B1 | 10/2005 | Lorsch | |
| 6,955,846 | B2 | 10/2005 | Lerner | |
| D512,311 | S | 12/2005 | DeLuca et al. | |
| D513,182 | S | 12/2005 | DeLuca et al. | |
| 7,032,774 | B2 | 4/2006 | Boehm | |
| 7,059,794 | B2 | 6/2006 | Weeks | |
| 7,125,463 | B2 | 10/2006 | Lerner et al. | |
| 7,128,211 | B2 | 10/2006 | Nishi | |
| 7,165,375 | B2 | 1/2007 | O'Dowd | |
| 7,223,462 | B2 | 5/2007 | Perkins et al. | |
| 7,297,387 | B2 | 11/2007 | Koyanagi | |
| 7,331,542 | B2 | 2/2008 | Coffiadiferro et al. | |
| 7,467,738 | B2 | 12/2008 | Woods | |
| 7,513,090 | B2 | 4/2009 | Wehrmann | |
| 7,533,772 | B2 | 5/2009 | Yoshifusa et al. | |
| 7,553,772 | B1 | 5/2009 | Yoshifusa et al. | |
| 7,540,125 | B2 | 6/2009 | Lindquist | |
| 7,550,191 | B2 | 6/2009 | Lerner | |
| 7,552,257 | B2 | 6/2009 | Becker et al. | |
| D596,031 | S | 7/2009 | Wehrmann | |
| 7,571,584 | B2 * | 8/2009 | Lerner | B31D 5/0073 156/147 |
| 7,578,333 | B2 | 8/2009 | Greenwood et al. | |
| D599,118 | S | 9/2009 | Perkins et al. | |
| 7,603,830 | B2 | 10/2009 | Nowakowski | |
| 7,607,911 | B2 | 10/2009 | Sperry et al. | |
| D603,705 | S | 11/2009 | Wehrmann | |
| 7,621,104 | B2 | 11/2009 | Piucci | |
| 7,621,810 | B2 | 11/2009 | Gilmore | |
| 7,665,394 | B2 | 2/2010 | Roberts | |
| 7,694,495 | B2 | 4/2010 | Wehrmann | |
| 7,712,287 | B2 | 5/2010 | Gallimore | |
| 7,718,028 | B2 | 5/2010 | Lerner et al. | |
| 7,757,459 | B2 | 7/2010 | Wehrmann | |
| 7,767,288 | B2 | 8/2010 | Lerner | |
| D630,945 | S | 1/2011 | Wehrmann | |
| D633,792 | S | 3/2011 | Wehrmann | |
| 7,897,219 | B2 | 3/2011 | Wehrmann | |
| 7,897,220 | B2 * | 3/2011 | Wehrmann | B31D 5/0073 428/35.2 |
| 7,950,433 | B2 | 5/2011 | Sperry et al. | |
| 7,975,457 | B2 | 7/2011 | Wehrmann | |
| 8,038,348 | B2 | 10/2011 | Lerner | |
| 8,061,110 | B2 | 11/2011 | Wetch | |
| 8,128,770 | B2 | 3/2012 | Wetsch et al. | |
| 8,276,797 | B2 | 10/2012 | Dwyer | |
| 8,307,617 | B2 | 11/2012 | Riccardi et al. | |
| 8,354,150 | B2 * | 1/2013 | Whermann | B31D 5/0073 428/34.1 |
| 8,357,439 | B2 | 1/2013 | Wehrmann | |
| 8,425,994 | B2 | 4/2013 | Wehrmann | |
| 8,568,283 | B2 | 10/2013 | Broering | |
| 9,205,622 | B2 * | 12/2015 | Wehrmann | B31D 5/0073 |
| 9,266,300 | B2 | 2/2016 | Chuba | |
| 9,283,729 | B2 | 3/2016 | Wehrmann et al. | |
| 9,315,319 | B2 | 4/2016 | Maxwell | |
| 9,550,339 | B2 | 1/2017 | Wehrmann et al. | |
| 2001/0000719 | A1 | 5/2001 | Lerner | |
| 2001/0000737 | A1 | 5/2001 | Johnson et al. | |
| 2001/0013215 | A1 | 8/2001 | Fuss et al. | |
| 2001/0014980 | A1 | 8/2001 | Patterson et al. | |
| 2002/0108697 | A1 | 8/2002 | Perkins et al. | |
| 2002/0155246 | A1 | 10/2002 | Johnson et al. | |
| 2002/0174629 | A1 | 11/2002 | Cronauer et al. | |
| 2003/0051440 | A1 | 3/2003 | Chow et al. | |
| 2003/0089082 | A1 | 5/2003 | Fuss et al. | |
| 2003/0094395 | A1 | 5/2003 | Peper et al. | |
| 2003/0109369 | A1 | 6/2003 | Lerner et al. | |
| 2004/0000581 | A1 | 1/2004 | Brandolini et al. | |
| 2004/0022457 | A1 | 2/2004 | Brown | |
| 2004/0154728 | A1 | 8/2004 | Selle et al. | |
| 2004/0173073 | A1 | 9/2004 | Wilkes | |
| 2004/0216429 | A1 | 11/2004 | Tanaka et al. | |
| 2004/0232031 | A1 | 11/2004 | Nish et al. | |
| 2004/0265523 | A1 | 12/2004 | Koyanagi et al. | |
| 2005/0221059 | A1 | 10/2005 | Matarasso | |
| 2005/0266189 | A1 | 12/2005 | Wehrmann | |

(56) References Cited

U.S. PATENT DOCUMENTS

| | | | |
|---|---|---|---|
| 2006/0042191 | A1 | 3/2006 | Lerner |
| 2006/0086064 | A1 | 4/2006 | Wehrmann |
| 2006/0090421 | A1 | 5/2006 | Sperry |
| 2006/0218879 | A1 | 10/2006 | Garceau et al. |
| 2006/0218880 | A1 | 10/2006 | Sperry et al. |
| 2006/0262997 | A1 | 11/2006 | Hersehy et al. |
| 2007/0017978 | A1 | 1/2007 | Ho |
| 2007/0054074 | A1 | 3/2007 | Wehrmann |
| 2007/0054075 | A1 | 3/2007 | Wehrmann |
| 2007/0084322 | A1 | 4/2007 | Williams |
| 2007/0100076 | A1 | 5/2007 | Hayes |
| 2008/0022630 | A1 | 1/2008 | Fuss et al. |
| 2008/0066852 | A1 | 3/2008 | Wetsch et al. |
| 2008/0175522 | A1 | 7/2008 | Chuang |
| 2009/0094939 | A1 | 4/2009 | Wetsch |
| 2009/0110864 | A1 | 4/2009 | Wehrmann |
| 2009/0293427 | A1 | 12/2009 | Lerner et al. |
| 2010/0221466 | A1 | 9/2010 | Wehrmann |
| 2010/0281828 | A1 | 11/2010 | Wehrmann |
| 2010/0282824 | A1 | 11/2010 | Kannankeril et al. |
| 2011/0165352 | A1 | 7/2011 | Wehrmann |
| 2011/0167772 | A1 | 7/2011 | Piucci |
| 2012/0084999 | A1 | 4/2012 | Davis et al. |
| 2012/0214658 | A1 | 8/2012 | Chuba |
| 2013/0011510 | A1 | 1/2013 | Chuba |
| 2013/0032293 | A1 | 2/2013 | Birkle |
| 2013/0067860 | A1 | 3/2013 | McDonald |
| 2013/0216788 | A1 | 8/2013 | Schellenberger |
| 2014/0130461 | A1 | 5/2014 | Johan |
| 2014/0260094 | A1 | 5/2014 | Wehrmann |
| 2014/0314978 | A1 | 10/2014 | Lepine |

FOREIGN PATENT DOCUMENTS

| | | | |
|---|---|---|---|
| CL | 201201261 | | 5/2012 |
| EP | 597446 | A1 | 5/1994 |
| EP | 1466720 | | 10/2004 |
| EP | 1466839 | A1 | 10/2004 |
| EP | 2143555 | A1 | 1/2010 |
| EP | 2634097 | A1 | 4/2013 |
| FR | 2574375 | A1 | 6/1986 |
| GB | 2074128 | A | 10/1981 |
| GB | 2384459 | | 7/2003 |
| JP | 50165753 | | 12/1950 |
| JP | 57-55805 | | 4/1982 |
| JP | S 61115805 | A | 6/1986 |
| JP | 6215930 | | 1/1987 |
| JP | 61115805 | | 11/1987 |
| JP | 63067936 | | 11/1990 |
| JP | H 03162231 | A | 7/1991 |
| JP | H0749680 | A | 2/1995 |
| JP | 07285581 | | 10/1995 |
| JP | 2000062793 | | 2/2000 |
| JP | 2003002368 | | 1/2003 |
| JP | 2006069641 | A1 | 3/2006 |
| JP | 4504462 | B1 | 7/2010 |
| JP | 201025981 | | 2/2011 |
| JP | 5469484 | B2 | 4/2014 |
| WO | 9746453 | | 12/1997 |
| WO | 0071423 | | 11/2000 |
| WO | 0153153 | | 7/2001 |
| WO | 0185434 | | 11/2001 |
| WO | 0226589 | | 4/2002 |
| WO | 05118408 | | 12/2005 |
| WO | 07070240 | | 6/2007 |
| WO | 0958749 | | 5/2009 |
| WO | 2010/109727 | A1 | 9/2010 |
| WO | 2010/129530 | A1 | 11/2010 |
| WO | 2013006779 | A1 | 1/2013 |
| WO | 2013/022398 | A1 | 2/2013 |

OTHER PUBLICATIONS

Response from U.S. Appl. No. 12/394,781 dated Oct. 10, 2011.
International Search Report and Written Opinion from PCT/US05/18817 dated Mar. 30, 2007.
International Search Report and Written Opinion from PCT/US06/45447, dated Feb. 22, 2007.
International Search Report and Written Opinion from PCT/US08/81410 dated Mar. 31, 2009.
International Search Report and Written Opinion from PCT/US09/38344 dated Dec. 22, 2009.
Office action from U.S. Appl. No. 10/408,946 dated Jun. 7, 2004.
Amendment from U.S. Appl. No. 10/408,946 dated Sep. 23, 2004.
Office action from U.S. Appl. No. 10/408,946 dated Jan. 6, 2005.
Interview Summary from U.S. Appl. No. 10/408,946 dated Mar. 4, 2005.
Response from U.S. Appl. No. 10/408,946 dated Mar. 10, 2005.
Notice of Allowance from U.S. Appl. No. 10/408,946 dated Apr. 25, 2005.
Notice of Allowance from U.S. Appl. No. 10/408,947 dated Dec. 21, 2004.
Office action from U.S. Appl. No. 11/111,164 dated Apr. 27, 2006.
Response from U.S. Appl. No. 11/111,164 dated Jul. 17, 2006.
Notice of Allowance from U.S. Appl. No. 11/111,164 dated Aug. 23, 2006.
Office action from U.S. Appl. No. 11/141,304 dated Nov. 7, 2008.
Amendment from U.S. Appl. No. 11/141,304 dated Jan. 20, 2009.
Office action from U.S. Appl. No. 11/141,304 dated Apr. 28, 2009.
Amendment from U.S. Appl. No. 11/141,304 dated Jun. 24, 2009.
Office action from U.S. Appl. No. 11/141,304 dated Aug. 7, 2009.
Amendment from U.S. Appl. No. 11/141,304 dated Jan. 7, 2010.
Notice of Allowance from U.S. Appl. No. 11/141,304 dated Mar. 31, 2010.
Office action (Restriction) from U.S. Appl. No. 11/194,375 dated Nov. 13, 2006.
Office action from U.S. Appl. No. 11/194,375 dated Feb. 6, 2007.
Amendment from U.S. Appl. No. 11/194,375 dated May 4, 2007.
Office action from U.S. Appl. No. 11/194,375 dated Aug. 21, 2007.
Amendment from U.S. Appl. No. 11/194,375 dated Oct. 2, 2007.
Advisory action from U.S. Appl. No. 11/194,375 dated Oct. 9, 2007.
Office action from U.S. Appl. No. 11/194,375 dated Nov. 20, 2007.
Amendment from U.S. Appl. No. 11/194,375 dated Feb. 29, 2008.
Office action from U.S. Appl. No. 11/194,375 dated Jun. 2, 2008.
Amendment from U.S. Appl. No. 11/194,375 dated Aug. 4, 2008.
Advisory action from U.S. Appl. No. 11/194,375 dated Aug. 12, 2008.
Office action from U.S. Appl. No. 11/194,375 dated Sep. 19, 2008.
Amendment from U.S. Appl. No. 11/194,375 dated Dec. 19, 2008.
Notice of Allowance from U.S. Appl. No. 11/194,375 dated Apr. 10, 2009.
Office action from U.S. Appl. No. 11/252,365 dated Jan. 31, 2008.
Amendment from U.S. Appl. No. 11/252,365 dated Mar. 18, 2008.
Notice of Allowance from U.S. Appl. No. 11/252,365 dated Feb. 27, 2009.
Amendment after Allowance from U.S. Appl. No. 11/252,365 dated Mar. 4, 2009.
Office action from U.S. Appl. No. 11/299,933 dated Mar. 19, 2008.
Response from U.S. Appl. No. 11/299,933 dated Jun. 3, 2008.
Office action from U.S. Appl. No. 11/299,933 dated Sep. 16, 2008.
Response from U.S. Appl. No. 11/299,933 dated Nov. 17, 2008.
Office action from U.S. Appl. No. 11/299,933 dated Dec. 18, 2008.
Amendment from U.S. Appl. No. 11/299,933 dated Mar. 6, 2009.
Office action from U.S. Appl. No. 11/299,933 dated Jun. 12, 2009.
Response to Office action from U.S. Appl. No. 11/299,933 dated Dec. 9, 2009.
Office action from U.S. Appl. No. 11/299,933 dated Dec. 31, 2009.
Response from U.S. Appl. No. 11/299,933 dated Mar. 30, 2010.
Office action from U.S. Appl. No. 11/299,933 dated Jun. 14, 2010.
Response from U.S. Appl. No. 11/299,933 dated Oct. 14, 2010.
Notice of Allowance from U.S. Appl. No. 11/299,933 dated Dec. 28, 2010.
Office action from U.S. Appl. No. 11/496,654 dated Apr. 1, 2009.
Response from U.S. Appl. No. 11/496,654 dated Jun. 26, 2009.
Office action from U.S. Appl. No. 11/496,654 dated Aug. 11, 2009.
Amendment from U.S. Appl. No. 11/496,654 dated Dec. 11, 2009.
Office action from U.S. Appl. No. 11/496,654 dated Jan. 13, 2010.

(56) References Cited

OTHER PUBLICATIONS

Amendment from U.S. Appl. No. 11/496,654 dated Jun. 14, 2010.
Office action from U.S. Appl. No. 11/496,654 dated Jun. 28, 2010.
Pre-Appeal Brief Request and Notice of Appeal from U.S. Appl. No. 11/496,654 dated Nov. 29, 2010.
Office action from U.S. Appl. No. 11/496,645 dated Aug. 31, 2009.
Response from U.S. Appl. No. 11/496,645 dated Nov. 30, 2009.
Notice of Allowance from U.S. Appl. No. 11/496,645 dated Jan. 4, 2010.
Notice of Allowance from U.S. Appl. No. 11/496,645 dated Feb. 26, 2010.
Office action from U.S. Appl. No. 11/594,539 dated Apr. 19, 2010.
Response from U.S. Appl. No. 11/594,539 dated Jul. 19, 2010.
Office action from U.S. Appl. No. 11/594,539 dated Sep. 30, 2010.
Interview Summary from U.S. Appl. No. 11/594,539 dated Dec. 15, 2010.
Notice of Allowance from U.S. Appl. No. 11/594,539 dated Jan. 7, 2011.
Office action from U.S. Appl. No. 11/594,540 dated Sep. 3, 2010.
Response from U.S. Appl. No. 11/594,540 dated Dec. 3, 2010.
Office action from U.S. Appl. No. 11/594,540 dated Feb. 3, 2011.
Notice of Allowance from U.S. Appl. No. 29/332,921 dated Aug. 11, 2009.
Office action from U.S. Appl. No. 12/409,026 dated Feb. 4, 2010.
Response from U.S. Appl. No. 12/409,026 dated May 3, 2010.
Notice of Allowance from U.S. Appl. No. 12/409,026 dated Jun. 17, 2010.
Office action from U.S. Appl. No. 12/818,318 dated Dec. 10, 2010.
Office action from U.S. Appl. No. 12/507,220 dated Oct. 22, 2009.
Response to Office action from U.S. Appl. No. 12/507,220 dated Apr. 16, 2010.
Office action from U.S. Appl. No. 12/507,220 dated May 6, 2010.
Response from U.S. Appl. No. 12/507,220 dated Aug. 5, 2010.
Office action from U.S. Appl. No. 12/507,220 dated Aug. 12, 2010.
Amendment from U.S. Appl. No. 12/507,220 dated Dec. 13, 2010.
Office action from U.S. Appl. No. 12/507,220 dated Jan. 28, 2011.
Notice of allowance from U.S. Appl. No. 29/346,902 dated Sep. 9, 2010.
One page drawing, Briggs Bag 1, illustrates a web of pre-formed bags sold by Applicant for use in Applicant's SP machines more than one year prior to the priority date of the present application. Operation of Applicant's SP machines is disclosed by U.S. Pat. No. 4,969,310; U.S. Pat. No. 5,743,070; U.S. Pat. No. 5,944,424; U.S. Pat. No. 5,722,218; and U.S. Pat. No. 6,035,611.
One page drawing, Goody Bag 1, illustrates a web of pre-formed bags sold by Applicant for use in Applicant's SP machines more than one year prior to the priority date of the present application. Operation of Applicant's SP machines is disclosed by U.S. Pat. No. 4,969,310; U.S. Pat. No. 5,743,070; U.S. Pat. No. 5,944,424; U.S. Pat. No. 5,722,218; and U.S. Pat. No. 6,035,611.
Response from U.S. Appl. No. 11/496,654 dated May 31, 2011.
Office action from U.S. Appl. No. 12/394,781 dated Jun. 10, 2011.
Response from U.S. Appl. No. 12/818,318 dated Jun. 10, 2011.
Notice of Allowance from U.S. Appl. No. 11/496,654 dated Jun. 20, 2011.
Response to Non-Final Office Action from U.S. Appl. No. 13/036,172 dated Jun. 11, 2012.
Further Examination Report from EP Application No. 06838429.6 dated Apr. 30, 2012.
Response from EP Application No. 09789543.7 dated May 24, 2012.
Reasons for Requesting Pre-Appeal Brief Review from U.S. Appl. No. 12/259,419 dated Jun. 18, 2012.
Response to Office Action and Request for RCE from U.S. Appl. No. 11/594,540 dated Jun. 28, 2012.
Response to Office Action from U.S. Appl. No. 12/818,318 dated Jul. 9, 2012.
Office Action from U.S. Appl. No. 11/594,540 dated Jul. 16, 2012.
Final Office Action from U.S. Appl. No. 12/818,318 dated Aug. 8, 2012.
Reasons for Requesting Pre-Appeal Brief Review from U.S. Appl. No. 12/394,781 dated Aug. 3, 2012.
Office Action from U.S. Appl. No. 13/036,172 dated Aug. 21, 2012.
Response from U.S. Appl. No. 11/594,540 dated Jul. 5, 2011.
Office action from U.S. Appl. No. 11/594,540 dated Jul. 22, 2011.
Office action from U.S. Appl. No. 12/818,318 dated Jul. 29, 2011.
Office action from European Application No. 04252036.1 dated Jul. 19, 2011.
Search Report from European Application No. 05755434.7 dated Jul. 22, 2011.
Final Office Action from U.S. Appl. No. 11/594,540 dated Mar. 5, 2012.
Office action from U.S. Appl. No. 12/818,318 dated Mar. 8, 2012.
Response to Examiner's Report for Canadian Appl. No. 2,569,049 dated Apr. 11, 2012.
Communication from EP Application No. 05755434.7 dated Apr. 11, 2012.
Response from U.S. Appl. No. 11/594,540 dated Dec. 15, 2011.
Amendment in Response to Non-Final Office Action in U.S. Appl. No. 12/259,419 dated Dec. 7, 2011.
Office action from U.S. Appl. No. 12/259,419 dated Jan. 18, 2012.
Final Office Action from U.S. Appl. No. 12/394,781 dated Feb. 15, 2012.
Response to Final Office Action from U.S. Appl. No. 12/818,318 dated Dec. 29, 2011.
Office Action from U.S. Appl. No. 13/036,172 dated Jan. 9, 2012.
Response from European Application No. 04252036.1 dated Nov. 15, 2011.
Office Action for U.S. Appl. No. 12/394,781 dated Jan. 3, 2013.
Amendment with RCE for U.S. Appl. No. 12/818,318 dated Feb. 6, 2013.
First Examiner's Report in Canadian Patent Application No. 2,633,899 dated Jan. 21, 2013.
Notice of Panel Decision from Pre-Appeal Brief Review from U.S. Appl. No. 12/394,781 dated Aug. 22, 2012.
International Search Report and Written Opinion for PCT/US12/45718 dated Oct. 22, 2012.
Examination Report from Canadian Application No. 2,569,049 dated Aug. 8, 2012.
Response to Final Office Action with Terminal Disclaimer from U.S. Appl. No. 13/036,172 dated Oct. 26, 2012.
Notice of Allowance for U.S. Appl. No. 13/036,172 dated Nov. 16, 2012.
Examiner Initiated Interview Summary in U.S. Appl. No. 12/259,419 dated Dec. 7, 2012.
Notice of Allowance in U.S. Appl. No. 11/594,540 dated Dec. 28, 2012.
Response to Office Action from U.S. Appl. No. 14/550,034 dated May 8, 2017.
Final Office Action from U.S. Appl. No. 14/216,135 dated Jul. 21, 2017.
Office action from U.S. Appl. No. 13/866,165 dated Dec. 3, 2015.
Amendment from U.S. Appl. No. 13/866,165 dated Mar. 3, 2016.
Office Action from U.S. Appl. No. 13/866,165 dated May 31, 2016.
Office Action from U.S. Appl. No. 14/482,706 dated Apr. 20, 2016.
Office Action from U.S. Appl. No. 14/934,594 dated Apr. 13, 2016.
Office Action from U.S. Appl. No. 15/040,447 dated May 5, 2016.
Office Action from U.S. Appl. No. 14/550,034 dated Jun. 10, 2016.
Response to Office Action from U.S. Appl. No. 14/934,594 dated Jul. 7, 2016.
Response to Office Action from U.S. Appl. No. 13/866,165 dated Oct. 31, 2016.
Advisory Action from U.S. Appl. No. 13/866,165 dated Nov. 28, 2016.
Office Action from U.S. Appl. No. 13/866,165 dated Dec. 23, 2016.
Response to Office Action from U.S. Appl. No. 14/482,706 dated Oct. 19, 2016.
Final Office Action from U.S. Appl. No. 14/482,706 dated Nov. 9, 2016.
Notice of Allowance from U.S. Appl. No. 14/934,594 dated Nov. 7, 2016.
Response to Office Action from U.S. Appl. No. 15/040,447 dated Aug. 5, 2016.

(56) References Cited

OTHER PUBLICATIONS

Notice of Allowance from U.S. Appl. No. 15/040,447 dated Sep. 22, 2016.
Response to Office Action from U.S. Appl. No. 14/550,034 dated Oct. 10, 2016.
Office Action from U.S. Appl. No. 14/216,135 dated Feb. 6, 2017.
Response to Office Action from U.S. Appl. No. 14/482,706 dated Feb. 8, 2017.
Office Action from U.S. Appl. No. 14/550,034 dated Feb. 8, 2017.
International Search Report and Written Opinion for PCT/US2014/030424 dated Aug. 8, 2014.
International Search Report and Written Opinion for PCT/US2014/054965 dated Feb. 10, 2015.
International Search Report and Written Opinion from PCT/US2014/066799 dated Feb. 24, 2015.
Final Office Action in U.S. Appl. No. 12/394,781 dated Oct. 11, 2013.
Non-Final Office Action from U.S. Appl. No. 12/394,781 dated Dec. 16, 2014.
Response to Office Action from U.S. Appl. No. 12/394,781 dated Apr. 16, 2015.
Notice of Allowance from U.S. Appl. No. 12/394,781 dated Aug. 4, 2015.
Office action for U.S. Appl. No. 13/739,049 dated Jan. 28, 2014.
Response to Office Action for U.S. Appl. No. 13/739,049 dated Mar. 5, 2014.
Final Office Action for U.S. Appl. No. 13/739,049 dated Mar. 28, 2014.
Notice of Appeal, Pre-Appeal Brief Request for Review and Reasons for Request for Pre-Appeal Brief Review for U.S. Appl. No. 13/739,049 dated Sep. 25, 2014.
Office Action for U.S. Appl. No. 13/739,049 dated Mar. 10, 2015.
Response to Office Action for U.S. Appl. No. 13/739,049 dated Aug. 10, 2015.
Final Office Action for U.S. Appl. No. 13/739,049 dated Sep. 16, 2015.
Response to Final Office Action for U.S. Appl. No. 13/739,049 dated Oct. 20, 2015.
Notice of Allowance for U.S. Appl. No. 13/739,049 dated Nov. 10, 2015.
Response to Office Action in U.S. Appl. No. 12/818,318 dated Dec. 12, 2013.
Final Office Action from U.S. Appl. No. 12/818,318 dated Feb. 26, 2014.
Response in U.S. Appl. No. 13/866,165 dated Mar. 14, 2014.
Office Action for U.S. Appl. No. 13/866,165 dated May 21, 2014.
Office Action for U.S. Appl. No. 13/866,165 dated Nov. 10, 2014.
Response to Office Action for U.S. Appl. No. 13/866,165 dated Apr. 6, 2015.
Final Office Action for U.S. Appl. No. 13/866,165 dated Jun. 18, 2015.
Preliminary Amendment in U.S. Appl. No. 13/543,082 dated Jul. 22, 2013.
Office Action from U.S. Appl. No. 13/543,082 dated Jun. 19, 2014.
Amendment from U.S. Appl. No. 13/543,082 dated Dec. 19, 2014.
Office Action from U.S. Appl. No. 13/543,082 dated Apr. 6, 2015.
Response to Office Action from U.S. Appl. No. 13/543,082 dated Sep. 4, 2015.
Notice of Allowance from U.S. Appl. No. 13/543,082 dated Oct. 14, 2015.
Amendment After Allowance from U.S. Appl. No. 13/543,082 dated Nov. 17, 2015.
Response to Office Action for U.S. Appl. No. 13/866,165 dated Nov. 18, 2015.
Office Action for U.S. Appl. No. 13/739,049 dated Jun. 20, 2013.
Office action from U.S. Appl. No. 12/818,318 dated Jul. 12, 2013.
Response to Office action for U.S. Appl. No. 12/394,781 dated Jul. 2, 2013.
Office action from U.S. Appl. No. 13/866,165 dated Sep. 18, 2013.
International Search Report and Written Opinion from PCT/US2016/068025 dated Apr. 10, 2017.
Response to Office Action from U.S. Appl. No. 14/216,135 dated Jun. 6, 2017.
Response Office Action from U.S. Appl. No. 13/866,165 dated Jun. 21, 2017.
Office Action from U.S. Appl. No. 14/482,706 dated Jun. 12, 2017.
Notice of Allowance from U.S. Appl. No. 14/550,034 dated Jun. 26, 2017.
Response to Office Action from U.S. Appl. No. 13/866,165 dated Feb. 8, 2018.
Response to Office Action from U.S. Appl. No. 14/216,135 dated Dec. 20, 2017.
Office Action from U.S. Appl. No. 14/216,135 dated Feb. 1, 2018.
Amendment from U.S. Appl. No. 14/482,706 dated Nov. 3, 2017.
Office Action from U.S. Appl. No. 14/482,706 dated Dec. 6, 2017.
Amendment from U.S. Appl. No. 14/482,706 dated Feb. 27, 2018.
Amendment from U.S. Appl. No. 14/665,515 dated Feb. 28, 2018.
Office Action from U.S. Appl. No. 14/216,135 dated Aug. 16, 2018.
Response Office Action from U.S. Appl. No. 14/216,135 dated Jan. 16, 2019.
Response to Office Action from U.S. Appl. No. 14/482,706 dated Aug. 3, 2018.
Office Action from U.S. Appl. No. 14/482,706 dated Sep. 6, 2018.
Amendment from U.S. Appl. No. 14/482,706 dated Mar. 6, 2019.
Office Action from U.S. Appl. No. 15/010,809 dated Oct. 1, 2018.
Amendment from U.S. Appl. No. 15/010,809 dated Mar. 1, 2019.
Office Action from U.S. Appl. No. 15/386,795 dated Jan. 11, 2019.
Restriction Requirement from U.S. Appl. No. 15/412,126 dated Mar. 13, 2019.
Amendment from U.S. Appl. No. 13/866,165 dated Mar. 12, 2019.
Amendment from U.S. Appl. No. 14/665,515 dated Feb. 11, 2019.
Office Action from U.S. Appl. No. 13/866,165 dated Sep. 8, 2017.
Amendment After Notice of Allowance from U.S. Appl. No. 14/550,034 dated Aug. 8, 2017.
Examiner's Response to Amendment Under Rule 312 from U.S. Appl. No. 14/550,034 dated Aug. 18, 2017.
Miscellaneous Communication from Examiner from U.S. Appl. No. 14/550,034 dated Aug. 29, 2017.
Office Action from U.S. Appl. No. 14/665,515 dated Aug. 28, 2017.
Office Action from U.S. Appl. No. 13/866,165 dated May 10, 2018.
Response to Office Action from U.S. Appl. No. 14/216,135 dated May 1, 2018.
Office Action from U.S. Appl. No. 14/482,706 dated Apr. 3, 2018.
Office Action from U.S. Appl. No. 14/665,515 dated Apr. 10, 2018.
Response to Office Action from U.S. Appl. No. 13/866,165 dated Aug. 5, 2019.
Response to Office Action from U.S. Appl. No. 14/216,135 dated Aug. 6, 2019.
Office Action from U.S. Appl. No. 15/386,795 dated Jul. 5, 2019.
Response to Restriction Requirement from U.S. Appl. No. 15/412,126 dated Jun. 13, 2019.
Notice of Allowance from U.S. Appl. No. 15/412,126 dated Aug. 21, 2019.
Office Action from U.S. Appl. No. 13/866,165 dated Apr. 5, 2019.
Notice of Allowance from U.S. Appl. No. 14/665,515 dated Apr. 10, 2019.
Notice of Allowance from U.S. Appl. No. 15/010,809 dated Mar. 25, 2019.
Office Action from U.S. Appl. No. 14/482,706 dated Apr. 24, 2019.
Office Action from U.S. Appl. No. 14/216,135 dated Apr. 10, 2019.
Response to Office Action from U.S. Appl. No. 15/386,795 dated Jun. 11, 2019.
Notice of Allowance from U.S. Appl. No. 14/216,135 dated Sep. 11, 2019.
Amendment from U.S. Appl. No. 14/482,706 dated Sep. 24, 2019.
Office Action from U.S. Appl. No. 14/482,706 dated Oct. 28, 2019.
Office Action from U.S. Appl. No. 13/866,165 dated Nov. 1, 2019.

* cited by examiner

WEB AND METHOD FOR MAKING FLUID FILLED UNITS

RELATED APPLICATIONS

This application is a divisional application of U.S. patent application Ser. No. 11/299,933, filed Dec. 12, 2005, entitled “Web and Method for Making Fluid Filled Units”, which is a continuation-in-part of pending U.S. patent application Ser. No. 11/194,375, entitled “Web and Method for Making Fluid Filled Units,” filed on Aug. 1, 2005, which is a continuation-in-part of U.S. patent application Ser. No. 11/141,304, entitled “Web and Method for Making Fluid Filled Units,” filed on May 31, 2005, which claim the benefit of U.S. Provisional Patent Application Ser. Nos. 60/576,004, entitled “Web for Fluid Filled Unit Formation,” filed on Jun. 1, 2004, and 60/592,812, entitled “Air Pouch Machine,” filed on Jul. 30, 2004, the entire disclosures all of which are fully incorporated herein by reference.

FIELD OF THE INVENTION

The present application relates to fluid filled units and more particularly to plastic webs of interconnected pouches and to processes of converting interconnected pouches to fluid filled units.

BACKGROUND

Machines for forming and filling dunnage units from sheets of plastic are known. Machines which produce dunnage units by inflating preformed pouches in a preformed web are also known. For many applications, machines which utilize preformed webs are preferred.

Typically, the entire length of sides of adjacent dunnage units formed from a preformed web are connected by perforations. In prior art webs, these perforations extend all the way to an inflation edge of the web.

SUMMARY

The present invention relates to plastic webs of interconnected pouches and processes of converting interconnected pouches to at least one row of dunnage units. In one embodiment, the web is an elongate flattened thermoplastic tube having an inflation edge and an opposite edge. The tube includes spaced transverse seals that define sides of pouches. The tube includes lines of perforations that allow adjacent dunnage units to be separated. A starting point of the lines of perforations is spaced apart from the inflation edge. The positions of the starting point of the lines of perforations with respect to the inflation edge is selected such that a cutter that cuts the inflation edge clears the line of perforations. Binding or wrinkling is therefore not caused by engagement of the cutter with the lines of perforations.

Further advantages and benefits will become apparent to those skilled in the art after considering the following description and appended claims in conjunction with the accompanying drawings.

DETAILED DESCRIPTION

Figure 1:
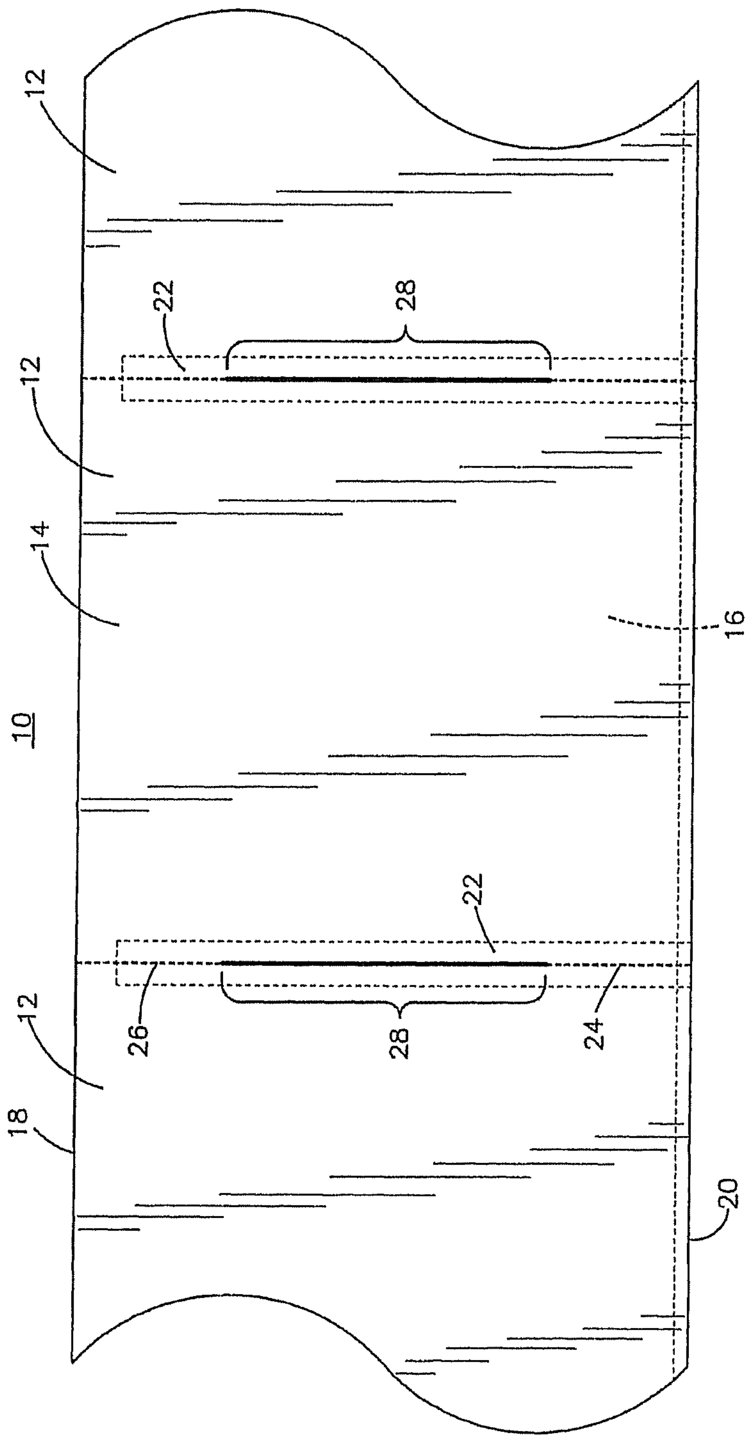
FIG. 1 illustrates a web for making fluid filled units.
Figure 2:
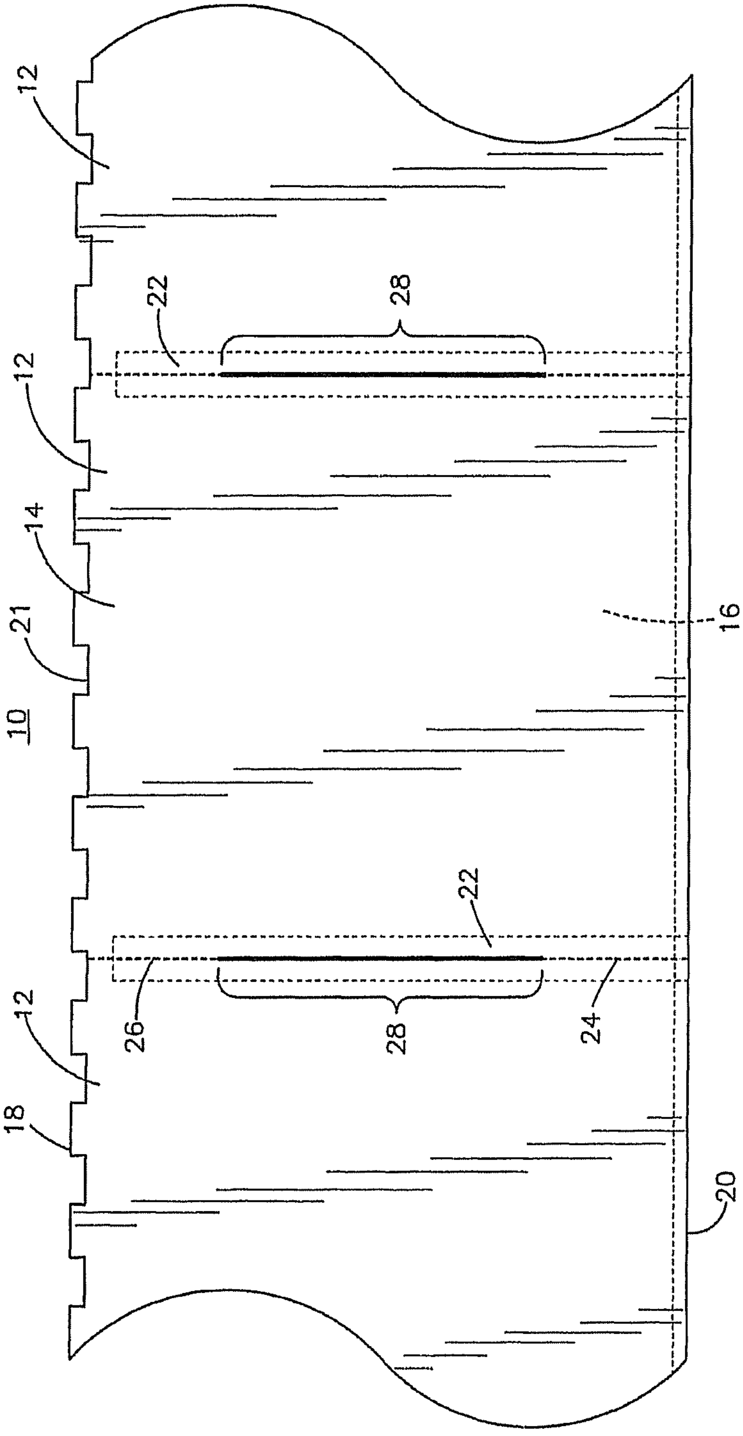
FIG. 2 illustrates a web for making fluid filled units.

Referring to FIGS. 1 and 2, exemplary illustrations of webs 10 of inflatable pouches 12 are shown. The webs 10 includes a top elongated layer of plastic 14 superposed onto a bottom layer of plastic 16. The layers are connected together along spaced edges, referred to as the inflation edge 18 and the opposite edge 20. In the example illustrated by FIG. 1, each edge 18, 20 is either a fold or a seal that connects the superposed layers 14, 16 along the edges 18, 20. The connection at the opposite edge 20 is illustrated as a hermetic seal and the connection at the inflation edge 18 is illustrated as a fold in FIG. 1. However, the fold and the seal could be reversed or both of the connections could be seals in the FIG. 1 embodiment. In the example illustrated by FIG. 2, the inflation edge 18 comprises a frangible connection 21 and the opposite edge 20 is a hermetic seal. The illustrated frangible connection 21 is a line of perforations. The size of the perforations is exaggerated to clarify FIG. 2. The frangible connection 21 may be formed by folding the inflation edge 18 and pulling the inflation edge over a serration forming wheel (not shown).

Referring to FIGS. 1 and 2, a plurality of longitudinally spaced, transverse seals 22 join the top and bottom layers 14, 16. Generally, each transverse seal 22 extends from the opposite edge 20 to within a short distance of the inflation edge 18. Spaced pairs of lines of perforations 24, 26 extend through the top and bottom layers terminating a short distance from the edges 18, 20 respectively. A gap forming area 28 extends between each associated pair of lines of perforations 24, 26. The gap forming area 28 opens to form a gap 13 when the pouches are inflated (see FIG. 3).

A gap forming area 28 denotes an area, preferably linear in shape, that will rupture or otherwise separate when exposed to a predetermined inflation force. The magnitude of the inflation force is less than the magnitude of the force needed to rupture or separate the spaced apart lines of perforations 24, 26. The gap forming area 28 can take on a number of embodiments, as will be discussed below. Any method that produces an area between the spaced apart lines of perforations 24, 26 that ruptures or otherwise separates at a force lower than a force needed to rupture or separate spaced lines of perforations 24, 26 may be employed to make the gap forming area 28.

Figure 3:
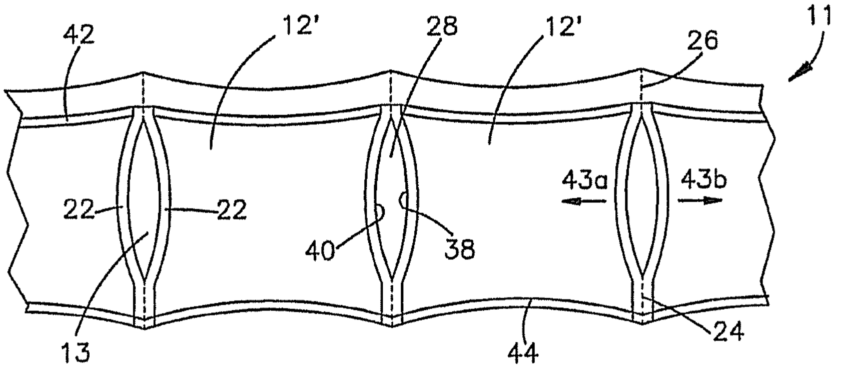
FIG. 3 illustrates a web with pouches inflated and sealed to form fluid filled units.

Referring to FIG. 3, the web 10 of pouches 12 (FIGS. 1 and 2) is inflated and sealed to form a row 11 of dunnage units 12'. The formed dunnage units 12' are configured to be much easier to separate from one another than prior art arrays of dunnage units. In the exemplary embodiment of FIG. 3, each adjacent pair of dunnage units 12' is connected together by a pair of spaced apart lines of perforations 24, 26. The spaced apart lines of perforations 24, 26 are spaced apart by a gap 13. A single row 11 of dunnage units 12' can be graphically described as being in a "ladder" configuration. This configuration makes separating two adjacent dunnage units 12' much easier than separating prior art arrays of dunnage units. To separate a pair of adjacent dunnage units 12, a worker simply inserts an object or objects, such as a hand or hands, into the gap 13 and pulls one dunnage unit 12' away from the other dunnage unit 12'. In the alternative, a mechanical system can be used to separate dunnage units 12'. A machine can be configured to insert an object between adjacent dunnage units 12' and apply a force to separate the units.

Referring to FIGS. 1-3, prior to conversion to a dunnage unit, a pouch is typically hermetically sealed on three sides, leaving one side open to allow for inflation. Once the pouch is inflated, the inflation opening is hermetically sealed and the dunnage unit is formed. During the inflation process, as the volume of the pouch increases the sides of the pouch have a tendency to draw inward. Drawing the sides of the pouches inward will shorten the length of the sides of the pouch unless the sides of the pouch are constrained. In this application, the term foreshortening refers to the tendency of the length of a pouch side to shorten as the pouch is inflated. In prior art webs, the sides of the pouch are restrained, because sides of adjacent pouches are connected by lines of perforations that extend along the entire length of the pouches and remain intact during and after inflation. The foreshortening of the unrestrained sides, such as the inflation opening, may not be uniform. Restraining the sides of adjacent connected pouches can cause undesirable inflation induced stresses. These undesirable stresses are caused because sides of adjacent pouches are connected and restrained, thus, limiting inflation and causing wrinkles to develop in the layers at the unrestrained inflation opening. The wrinkles can extend into a section of the inflation opening to be sealed to complete the dunnage unit, which may compromise the seal. One reason the seal can be compromised is that wrinkling can cause sections of the layers 14, 16 to fold on top of one another. A sealing station of a dunnage machine is typically set to apply the appropriate amount of heat to seal two layers of material. The sealing of multiple layers of material in the area of a wrinkle results in a seal that is weaker than remaining seal areas and may result in a small leak or tendency to rupture at loads lower than loads at which the dunnage units is designed to rupture.

In the embodiment illustrated by FIG. 3, the gap forming area 28, produces a gap 13 between adjacent pouches upon inflation. The gap allows foreshortening of the connected pouch sides and thereby reduces the undesirable stresses that are introduced during inflation as compared with prior art webs. In addition, the web with a gap 13 facilitates fuller inflation of each pouch. The gap 13 maintains the inflation opening substantially free of wrinkles as the inflation opening is sealed to convert the inflated pouches to dunnage units.

The illustrated web 10 is constructed from a heat sealable plastic film, such as polyethylene. The web 10 is designed to accommodate a process for inflating each pouch 12 in the web to create a row or ladder 11 of dunnage units 12'. The gap forming area 28 creates a gap 13 between dunnage units

12', which facilitate a efficient and effective process for separating adjacent dunnage units 12' in the row or ladder 11.

Figure 4:
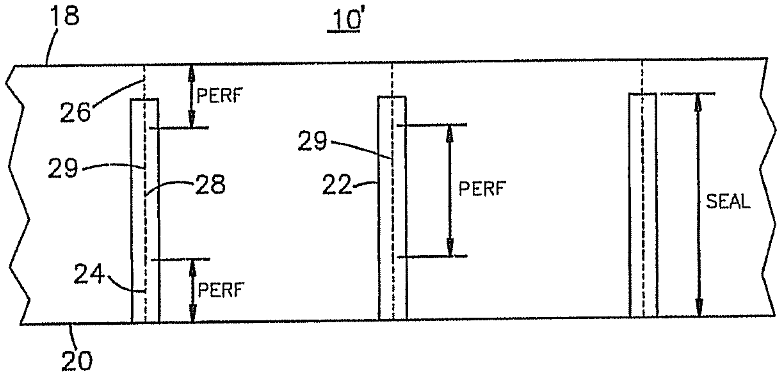
FIG. 4 illustrates a web for making fluid filled units.

In the example illustrated by FIG. 4, the gap forming area 28 defined by the web 10' includes an easily breakable line of perforations 29 between the spaced lines of perforations 24, 26. The force needed to rupture or separate the line of perforations 29 is less than the force needed to separate the perforations 24, 26 extending inward of the web edges 18, 20. Each pair of perforations 24, 26 and associated more easily breakable line of perforations 29 divide the transverse seal 22 into two transverse sections. As a pouch 12 is inflated, the line of perforation 29 begins to rupture or separate leading to the development of a gap 13 between the produced dunnage units 12' (See FIG. 3). Once the pouch 12 is fully inflated, the line of perforations 29 is fully or nearly fully ruptured; however the perforations 24, 26 at the edges remain intact. These perforations 24, 26 are ruptured or separated when a worker or automated process mechanically separates the perforations 24, 26.

Figure 5:
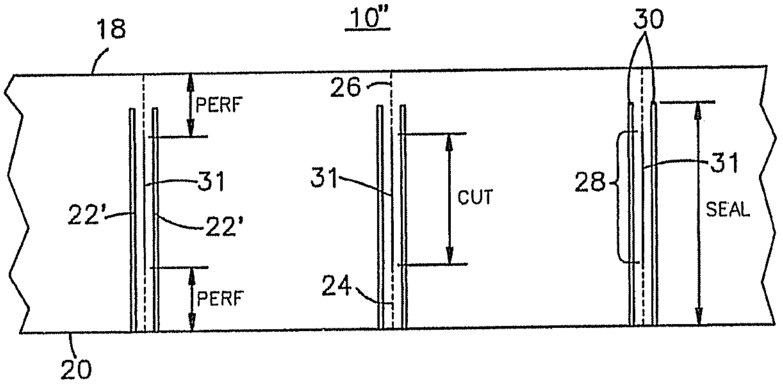
FIG. 5 illustrates a web for making fluid filled units.

FIG. 5 illustrates another embodiment of the web 10". In this embodiment the gap forming area 28 comprises an elongated cut 31 through both layers of material 14, 16. The cut 31 extends between each associated pair of lines of perforations 24, 26. In the embodiment illustrated by FIG. 5, pairs 30 of transverse seals 22' extend from the opposite edge 20 to within a short distance of the inflation edge 18. Each of the pairs of lines of perforations 24, 26 and corresponding cuts 31 are between an associated pair of transverse seals 30. It should be readily apparent that the seal 22 shown in FIG. 4 could be used with the cut 31 shown in FIG. 5. It should also be readily apparent that the line of perforations shown in FIG. 4 could be used with the transverse seals 22' shown in FIG. 5. It should be additionally apparent that any gap forming area 28 can be used with either of the transverse seal configurations 22, 22' shown in FIGS. 4 and 5.

Figure 6:
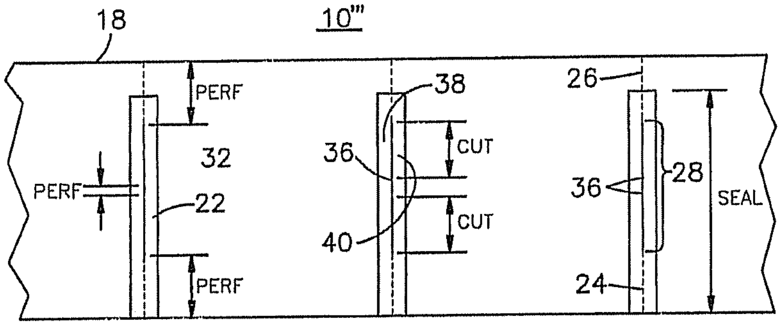
FIG. 6 illustrates a web for making fluid filled units.
Figure 7A:
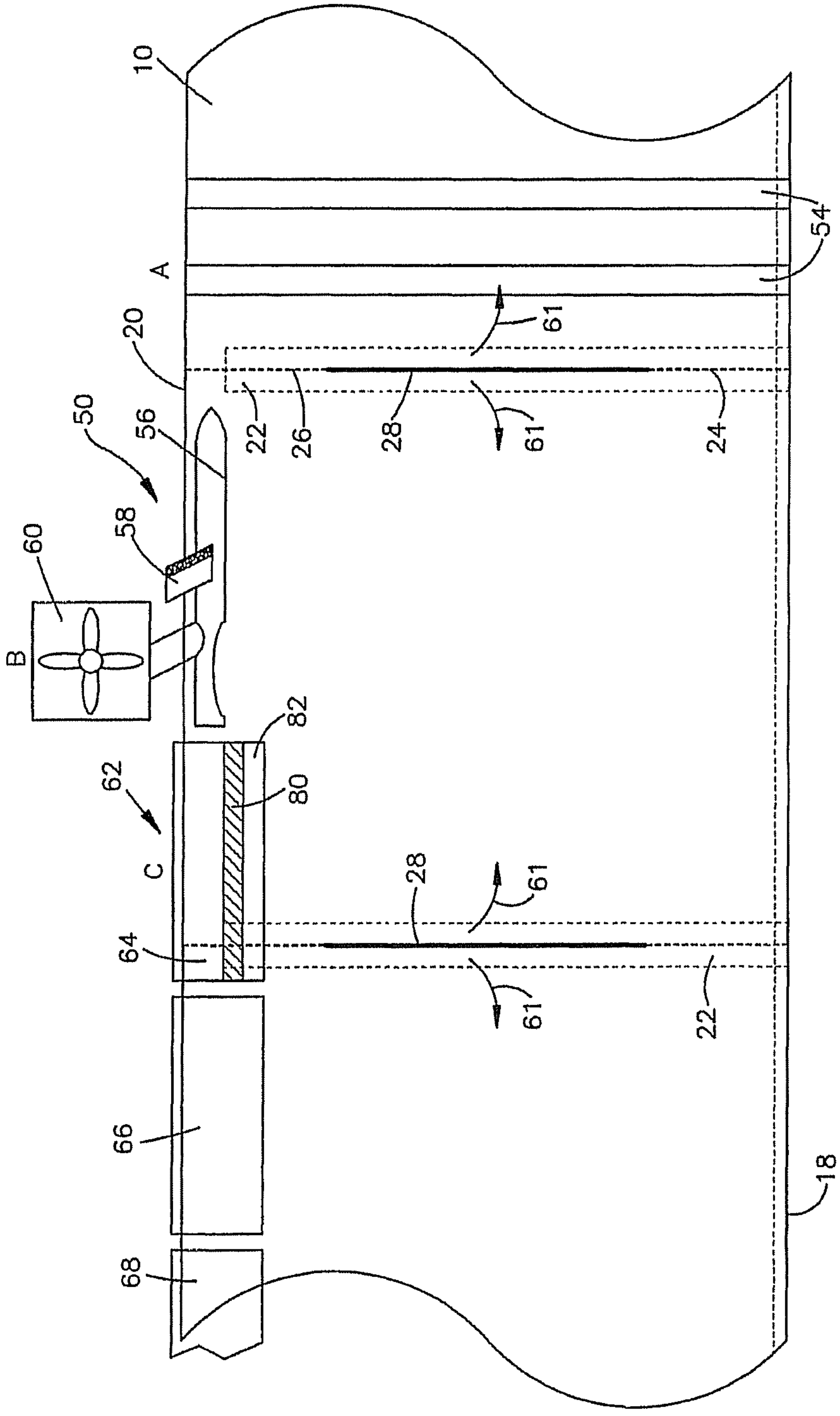
FIG. 7A schematically illustrates a plan view of a process and machine for converting web pouches to fluid filled units.
Figure 7B:
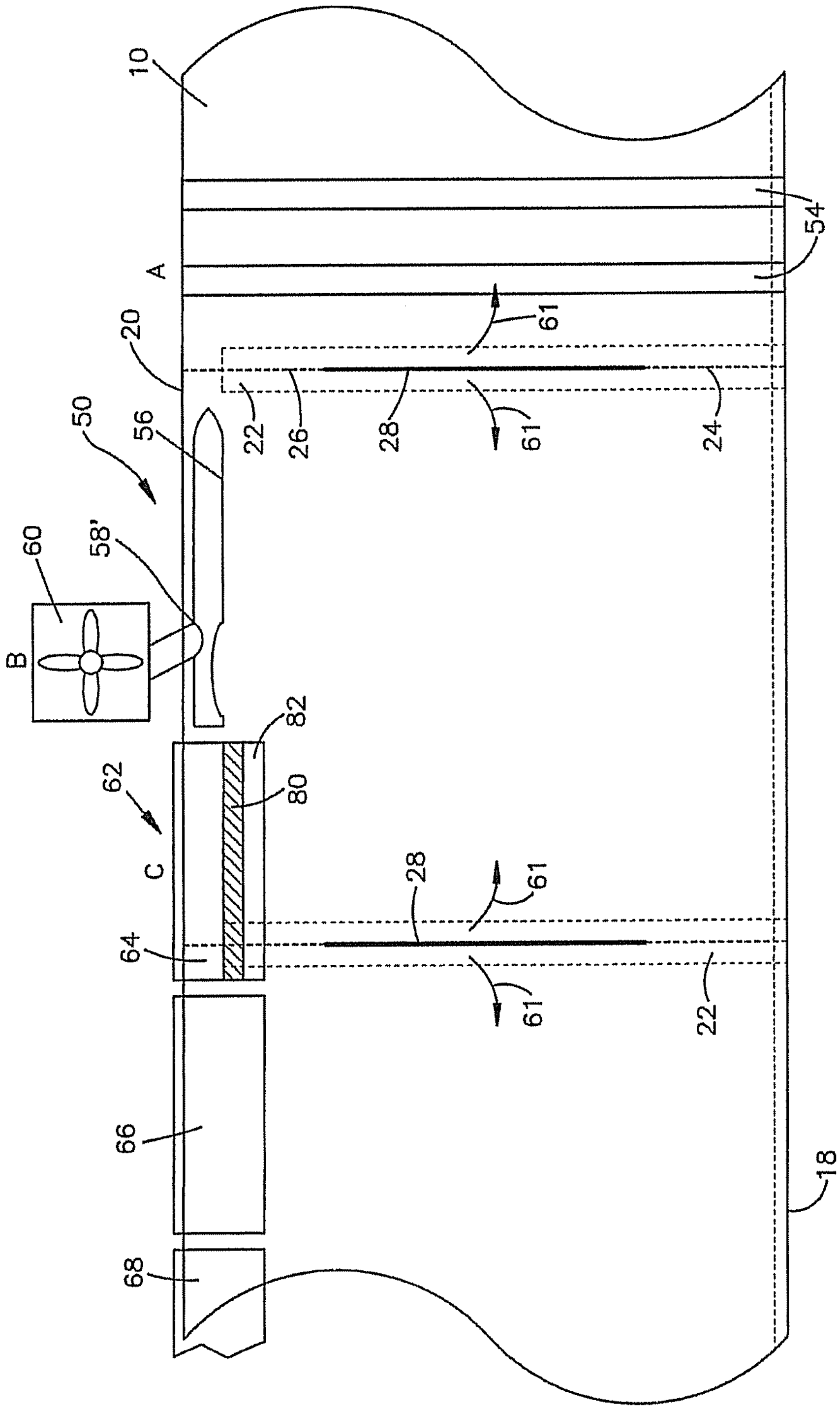
FIG. 7B schematically illustrates a plan view of a process and machine for converting web pouches to fluid filled units.

FIG. 6 illustrates a further embodiment of the web 10'''. In this embodiment, the gap forming area 28 comprises at least two elongated cuts 32, separated by light connections of plastic 36, also referred to as "ticks." These connections 36 hold transverse edges 38, 40 of the pouches 12 together to ease handling of the web 10, such as handling required during installation of the web 10 into a dunnage machine. As the pouches 12 are inflated, the connections 36 rupture or otherwise break resulting in a gap 13 between the spaced pairs of perforations 24, 26. This gap 13 allows for full inflation and reduces the stresses in the layers at the seal site normally caused by the foreshortening and restrictions on foreshortening of webs in the prior art. The reduced stress in the layers inhibits wrinkles along the inflation opening to be sealed.

Other methods of creating a gap forming area not specifically disclosed are with the scope of the present application. Any area that separates and forms a gap between adjacent pouches as pouches 12 in a web 10 are inflated are contemplated by this disclosure.

FIG. 3, illustrates a length of the web 10, 10', 10" or 10''' after it has been inflated and sealed to form dunnage units 12'. An inflation seal 42, the transverse seals 22 and an opposite edge seal 44 hermetically seal the top and bottom layers. The side edges 38, 40 of the formed dunnage units are separated to form a gap 13. Each pair of adjacent dunnage units 12' are connected together by the pair of spaced apart lines of perforations 24, 26. The gap 13 extends between the pair of spaced apart lines of perforations 24, 26. The array of dunnage units 12' is a single row of dunnage units in a "ladder" configuration. The lines of perforations 24, 26 are configured to be easily breakable by a worker or automated system. To separate a pair of adjacent units 12', a worker inserts an object, such as the worker's hand or hands into the gap 13. The worker then grasps one or both of the adjacent dunnage units 12' and pulls the adjacent dunnage units 12' relatively apart as indicated by arrows 43*a*, 43*b*. The lines of perforation 24, 26 rupture or otherwise separate and the two adjacent dunnage units 12' are separated. The existence of the gap 13 also results in reduced stresses in the area of the inflation seal 42 at the time of sealing and accommodates increased inflation volume of the dunnage units 12' as compared with prior inflated dunnage units.

In one embodiment, the line of perforations 24 that extends from the opposite edge 20 is omitted. In this embodiment, the gap forming area 28 extends from the inflation edge line of perforations 26 to the opposite edge. In this embodiment, the gap 13 extends from the inflation edge line of perforations 26 to the opposite edge 20.

The connection of the layers 14, 16 at the inflation edge 18 can be any connection that is maintained between layers 14, 16 prior to the web 10 being processed to create dunnage units 12'. In the embodiment illustrated by FIG. 1, the connection is a fold. In the embodiment illustrated by FIG. 2, the connection is a line of perforations 21. One method of producing such a web is to fold a continuous layer of plastic onto itself and create a fold at what is to become the inflation edge 18, A tool can be placed in contact with the fold to create a line of perforation. The opposite edge 20 can be hermetically sealed and the transverse hermetic seals 22 can be added along with the separated lines of perforations 24, 26 extending inward from the inflation and opposite edges 18, 20. The web shown in FIG. 1 can be produced in the same manner, except the perforations are not added.

FIGS. 7A, 7B, 8A, 8B and 9 schematically illustrate a machine 50 and process of converting the webs 10, 10', 10" and 10''' to dunnage units 12'. Referring to FIGS. 7A, 7B, 8A and 8B, a web 10, 10', 10" or 10''' is routed from a supply 52 (FIGS. 8A and 8B) to and around a pair of elongated, transversely extending guide rollers 54. The guide rollers 54 keep the web taut as the web 10 is pulled through the machine 50. At location A, the web pouches are uninflated. In the embodiment illustrated by FIG. 5, pouch edges 38, 40 defined by the cut 31 are close to one another at location A. In the embodiments illustrated by FIGS. 4 and 6, the frangible connections 29, 36 are of sufficient strength to remain intact at location A.

A longitudinally extending guide pin 56 is disposed in the web at station B. The guide pin 56 is disposed in a pocket bounded by the top and bottom layers 14, 16, the inflation edge 18, and ends of the transverse seals 22. The guide pin 56 aligns the web as it is pulled through the machine. In the embodiment illustrated by FIGS. 7A and 8A, a knife cutter 58 extends from the guide pin 56. The knife cutter 58 is used to cut the inflation edge 18 illustrated by FIG. 1, but could also be used to cut the perforated inflation edge 18 illustrated by FIG. 2. The cutter 58 slits the inflation edge 18 as the web moves through the machine 50 to provide inflation openings 59 (See FIG. 9) into the pouches, while leaving the pouches otherwise imperforate. A variation of this would have the cutter 58 cutting either layer 14, 16, or both near the inflation edge 18. In the embodiment illustrated by FIGS. 7B and 8B, the guide pin 56 defines a blunt surface 58' and the knife cutter is omitted. The blunt surface 58' is used to break the perforated inflation edge illustrated by FIG. 2. The blunt surface 58' breaks open the inflation edge 18 as the web moves through the machine to provide the inflation openings into the pouches 12.

Figure 9:
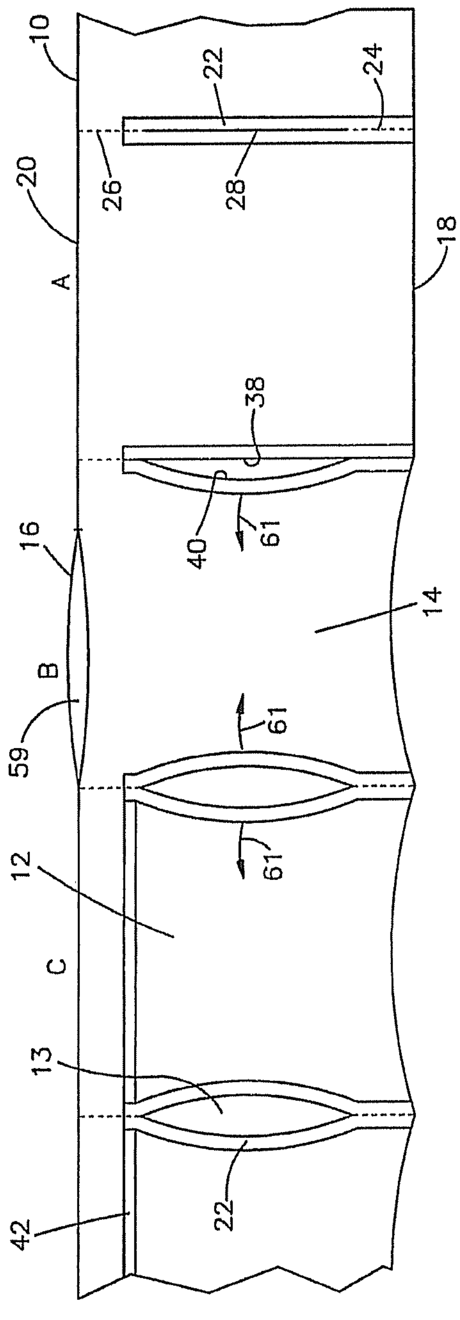
FIG. 9 illustrates a process for converting web pouches to fluid filled units.

A blower 60 is positioned after the cutter 58 or blunt surface 58' in station B. The blower 60 inflates the web pouches as the web moves past the blower. Referring to FIG. 9, the web pouches are opened and inflated at station B. The seal edges 38, 40 spread apart as indicated by arrows 61 (FIGS. 7A, 7B and 9) as the web pouches are inflated. In the embodiment illustrated by FIGS. 4 and 6, the frangible connections 29, 36 maintain successive pouches substantially aligned as the web is fed to the filling station B. The frangible connections are sufficiently weak that the connection between a pouch that has been opened for inflation and is being inflated at the fill station B and an adjacent, successive (or preceding) pouch will rupture as the pouch at the fill station is inflated. The spreading of the edges 38, 40 forms a row of inflated dunnage units in a ladder configuration and increases the volume of the air that can enter the pouches. The spreading also reduces the stresses imparted to the web adjacent the inflation side edge 18 where it is to be sealed.

Figure 8A:
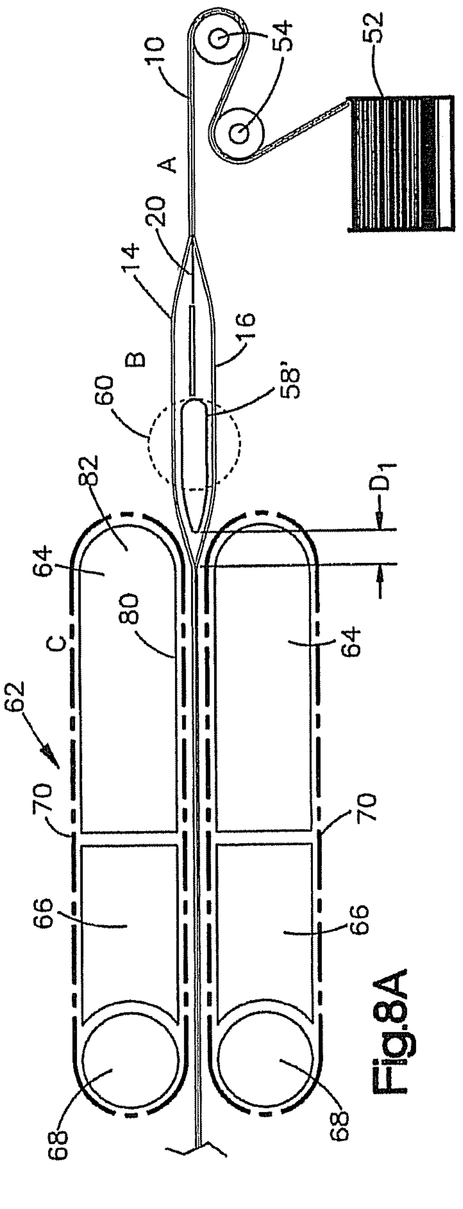
FIG. 8A schematically illustrates an elevational view of the process and machine for converting web pouches to fluid filled units.
Figure 8B:
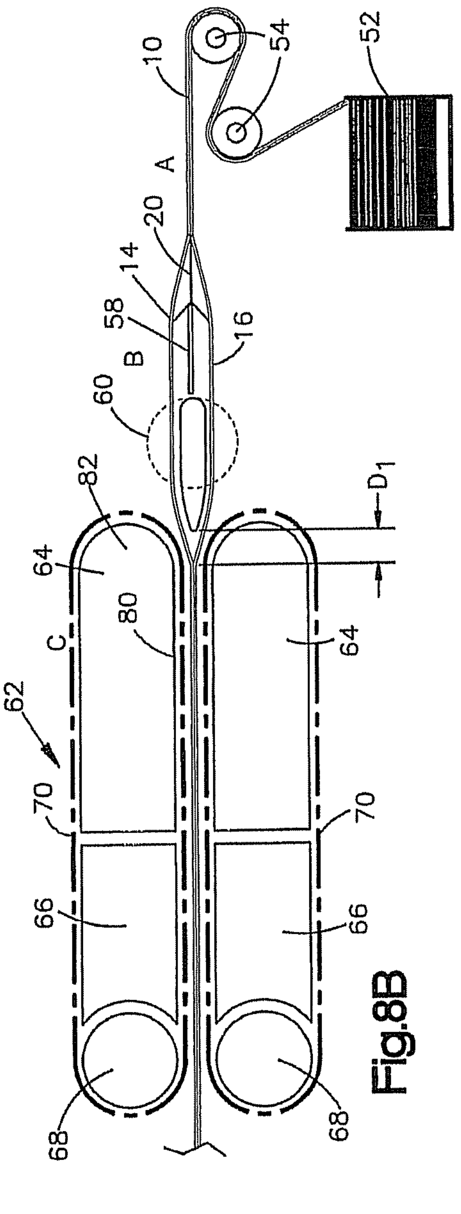
FIG. 8B schematically illustrates an elevational view of the process and machine for converting web pouches to fluid filled units.

The inflation seal 42 is formed at station C by a sealing assembly 62 to complete each dunnage unit. In the exemplary embodiment, the inflated volume of the pouches is maintained by continuing to blow air into the pouch until substantially the entire length of the inflation opening 59 is sealed. In the example of FIGS. 8A, 8B and 9, the blower 60 blows air into a pouch being sealed up to a location that is a short distance $D_1$ from closing position where the sealing assembly 62 pinches the top and bottom layers 14, 16 to maintain the inflated volume of the pouches. This distance $D_1$ is minimized to minimize the volume of air that escapes from the inflated pouch before the trailing transverse seal of the inflated pouch reaches the closing position. For example, the distance $D_1$ may be 0.250 inches or less, to blow air into the inflation opening unit the trailing transverse seal is within 0.250 inches of the closing position.

In the examples illustrated by FIGS. 8A and 8B, the sealing assembly includes a pair of heated sealing elements 64, a pair of cooling elements 66, a pair of drive rollers 68, and a pair of drive belts 70. In an alternate embodiment, the pair of cooling elements is omitted. Each belt 70 is disposed around its respective heat sealing element 64, cooling element 66 (if included), and drive roller 68. Each belt 70 is driven by its respective drive roller 68. The belts 70 are in close proximity or engage one another, such that the belts 70 pull the web 10 through the heat sealing elements 64 and the cooling elements 66. The seal 42 is formed as the web 10 passes through first the heated sealing elements 64 and then a heat sink such as the cooling elements. One suitable heating element 64 includes heating wire 80 carried by an insulating block 82. Resistance of the heating wire 80 causes the heating wire 80 to heat up when voltage is applied. The cooling elements 66 cool the seal 42 as the web 10 is pulled between the cooling elements. One suitable cooling element is an aluminum (or other heatsink material) block that transfers heat away from the seal 42. Referring to FIG. 9, the spreading of the edges 38, 40 greatly reduces the stress imparted on the web material at or near the seal 42. As a result, a much more reliable seal 42 is formed.

Figure 10:
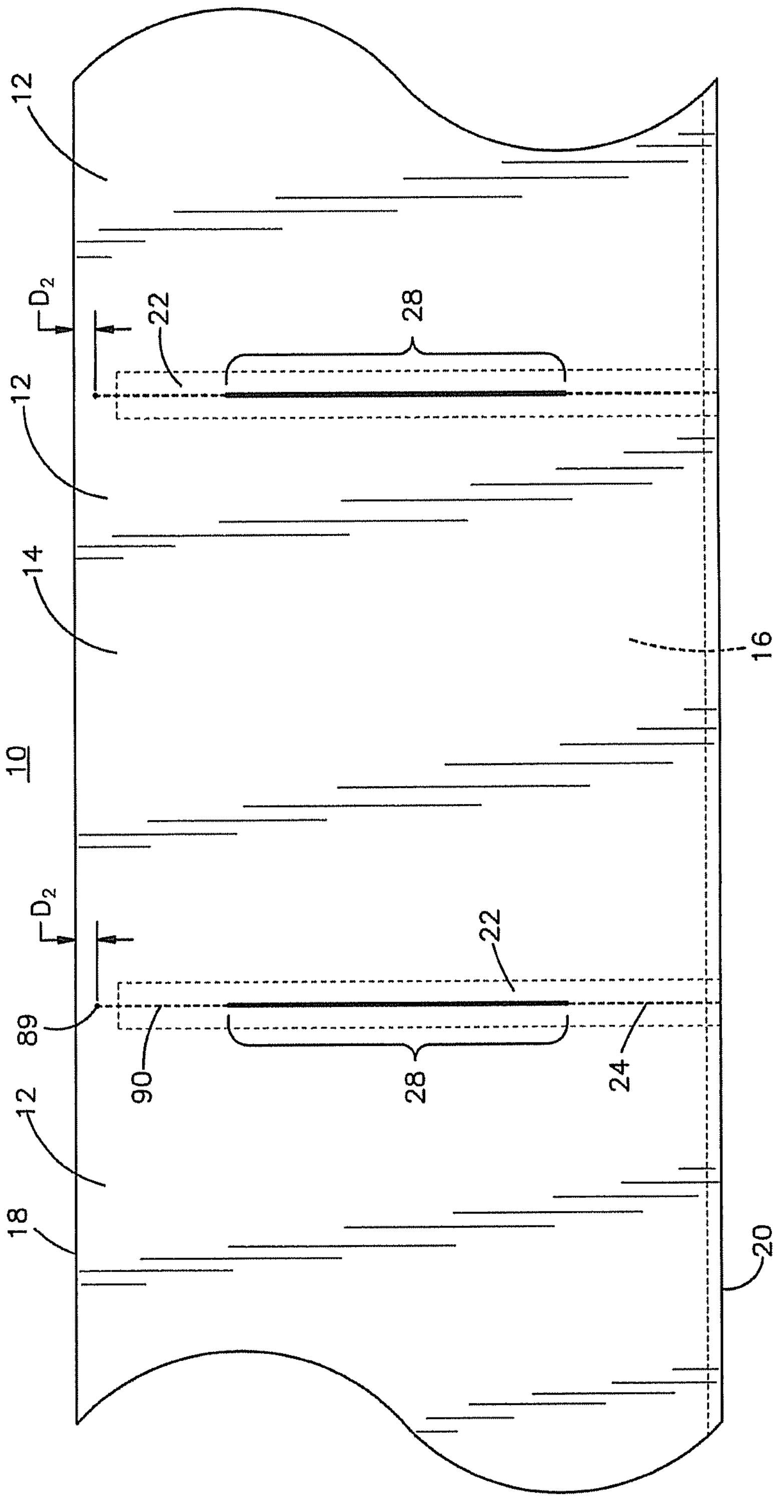
FIG. 10 illustrates a web for making fluid filled units.
Figure 11:
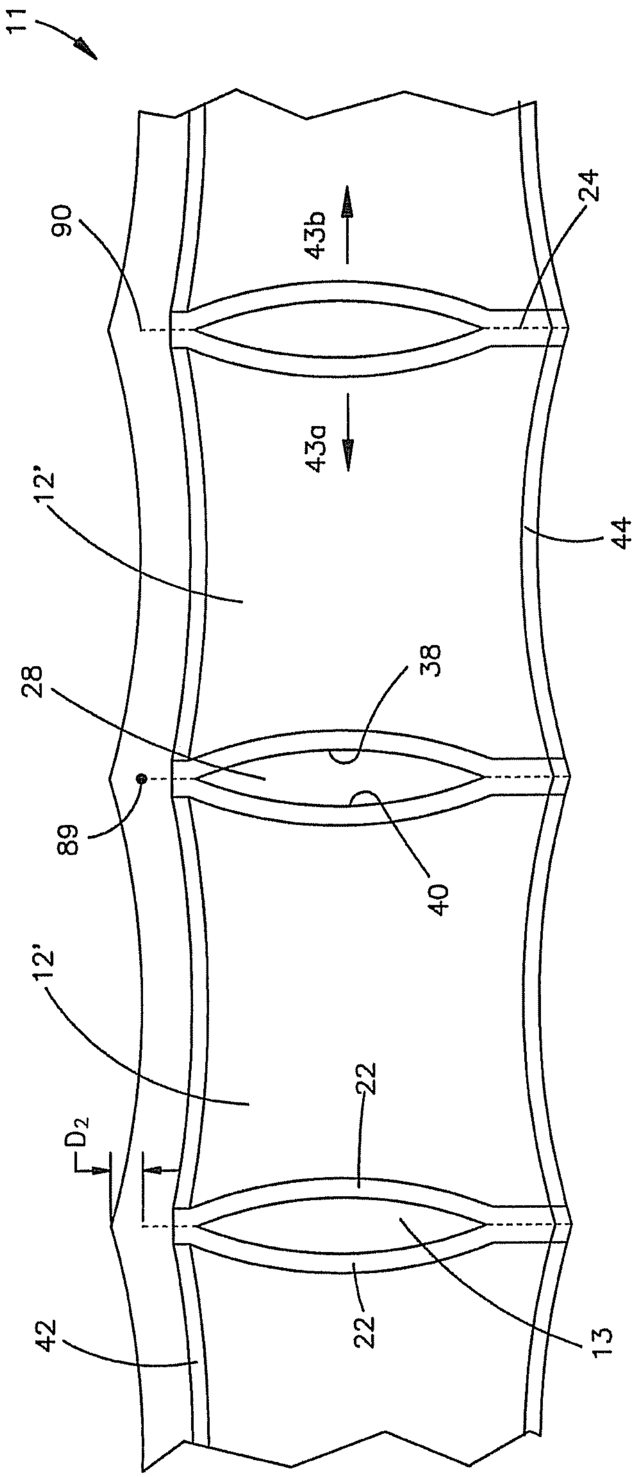
FIG. 11 illustrates a web of pouches inflated and sealed to form fluid filled units.
Figure 12:
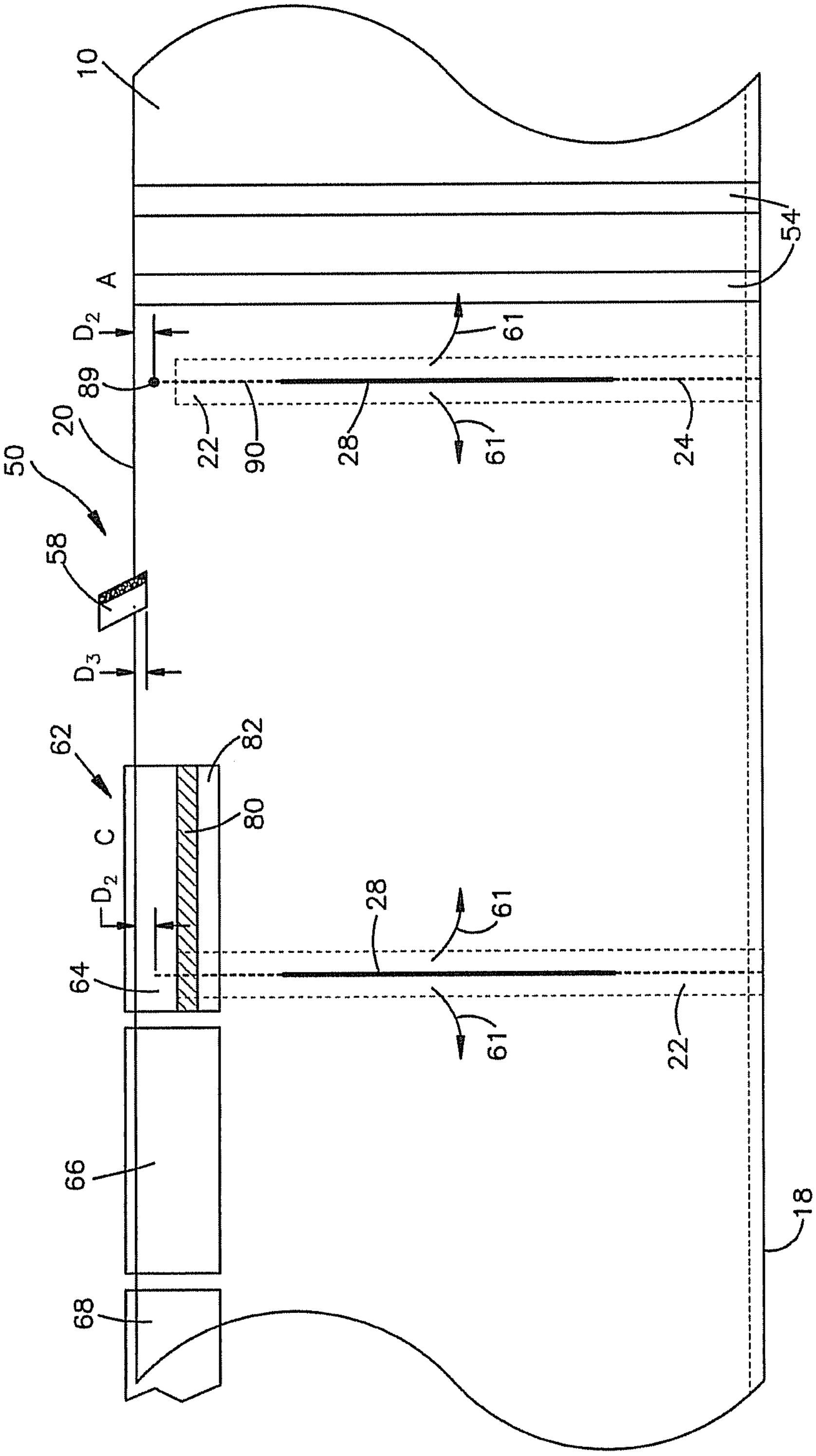
FIG. 12 schematically illustrates a plan view of a cutter for opening the inflation edge of a web.

FIGS. 10-12 show another embodiment of a web 10. In this embodiment, the spaced apart lines of perforations 26 extending from the inflation edge, as shown in FIGS. 1-7B and 9, is replaced with a modified line of perforations 90. As best seen in FIG. 10, a starting point 89 of the line of perforations 90 begins a distance $D_2$ from the inflation edge 18 and extends away from and generally perpendicular to the inflation edge 18. In the example illustrated by FIGS. 10-12, the line of perforations 90 extends to a gap forming area 28 and an opposite edge line of perforations 24 extends to the opposite edge. In another embodiment, the gap forming area 28 is not included and the line of perforations 90 extends all the way or nearly all the way to the opposite edge.

The distance $D_2$ is selected to prevent the cutter (FIG. 12) from engaging the line of perforations in the exemplary embodiment. Although distance $D_2$ may vary based on the particular cutter implemented, in one embodiment, distance $D_2$ is approximately 0.25 to 0.375 inch in length. FIG. 11 illustrates a row of inflated dunnage units. The elimination of perforations extending to the inflation edge 18 does not make it substantially harder to separate adjacent dunnage units in the row 11 of dunnage units 12' in the exemplary embodiment. The dunnage units 12' can still be separated by inserting an object or objects, such as a hand or hands, into the gap 13 and pulling one dunnage unit 12' away from an adjacent dunnage unit 12'. When the dunnage units are pulled apart, the thin web of material between the starting point 89 and the inflation edge easily breaks.

The process of forming perforations through the top and bottom layers of plastic 14, 16, as the web 10 is formed, may cause the top and bottom layers 14, 16 to be adhere or be held together at the line of a perforations. When the lines of perforations extend all the way to the inflation edge and the cutter 58 cuts on one side of the inflation edge, the cutter will engage each line of perforations. Engagement of the lines of perforations by the cutter may cause the web to bind, wrinkle, bunch up, or gather around the edge of the cutter until the cutter passes the line of perforations and begins cutting the web again. In the embodiment illustrated by FIGS. 10-12, engagement of the line of perforations 90 with the cutter is eliminated by beginning the line of perforations 90 a distance $D_2$ away from the inflation edge 20. As illustrated in FIG. 12, the tip of a cutter 58 utilized in opening the inflation edge 20 is positioned a distance $D_3$ past the inflation edge 20 as the edge is opened. The distance $D_2$ that the line of perforations 90 is away from the inflation edge 20 is configured to be greater that the distance $D_3$ to which the tip of a cutter 58 is positioned past the inflation edge 20. As a result, the cutter 58 will not engage the lines of perforations. This eliminates the possibility that the cutter could engage the lines of perforations and cause the web to bunch up or gather around the cutter 58 as the cutter 58 opens the inflation edge.

The present invention is not to be considered limited to the precise construction disclosed. Various modifications, adaptations and uses may occur to those skilled in the art to which the invention relates. All such modifications, adaptations, and uses fall within the scope or spirit of the claims.

The invention claimed is:

1. A web for forming dunnage units, comprising:
a first elongated layer;
a second elongated layer superposed over the first elongated layer, the first and second layers connected together at an inflation edge and an opposite seal;
a plurality of seals, each of said seals extending from the opposite seal to a seal end that is a first distance from the inflation edge, such that a plurality of inflatable pouches are bounded by the first elongated layer, the second elongated layer, the opposite seal, the inflation edge, and the seal ends;
a pocket having a single continuous weakened portion extending along the inflation edge from at least one seal to at least one next seal, wherein the single continuous weakened portion comprises a single line of inflation edge perforations connecting the first elongated layer to the second elongated layer, wherein the pocket is bounded by the first and second elongated layers, the inflation edge, and the seal ends, and wherein the weakened portion of the pocket breaks open proximate the inflation edge to open the pouches for inflation;
wherein sides of the inflatable pouches are defined by edges of said plurality of seals;
a first plurality of lines of perforations through the first and second elongated layers;
wherein each line of said first plurality of lines of perforations has a starting point between the sides of two adjacent inflatable pouches and between the inflation edge and the seal ends;
wherein each of said lines of said first plurality of lines of perforations extends toward the opposite edge; and
wherein the starting point is positioned such that a separation force required to separate two adjacent inflatable pouches by pulling the two adjacent inflatable pouches apart until the two adjacent inflatable pouches are separated is approximately the same as a separation force required to separate two otherwise identical adjacent inflatable pouches connected together by an otherwise identical line of perforations that extends all the way to the inflation edge.

2. The web of claim 1, wherein the starting points of the lines of the first plurality of lines of perforations is between 0.250 and 0.375 inches from the inflation edge.

3. The web of claim 1, wherein the starting point is selected such that each line of the first plurality of lines of perforations clears a cutter that cuts the inflation edge to open the pouches for inflation.

4. The web of claim 1, wherein the starting point is selected such that web between the starting point and the inflation edge breaks upon pulling adjacent dunnage units apart.

5. A web for forming dunnage units, comprising:
a first elongated layer;
a second elongated layer superposed over the first elongated layer, the first and second layers connected together at an inflation edge and an opposite seal;
a plurality of seals, each of said seals extending from the opposite edge to a seal end that is a first distance from the inflation edge, such that a plurality of inflatable pouches are bounded by the first elongated layer, the second elongated layer, the opposite edge, the inflation edge, and the seal ends;
a pocket having a single continuous weakened portion extending along the inflation edge from at least one seal to at least one next seal, wherein the single continuous weakened portion consists of a single line of inflation edge perforations connecting the first elongated layer to the second elongated layer, of said web, wherein the pocket is bounded by the first and second elongated layers, the inflation edge, and the seal ends, and wherein the weakened portion of the pocket breaks open proximate the inflation edge to open the pouches for inflation;
wherein sides of the inflatable pouches are defined by edges of said plurality of seals;
a first plurality of lines of perforations through the first and second elongated layers;

wherein each line of said first plurality of lines of perforations has a starting point between the sides of two adjacent inflatable pouches and between the inflation edge and the seal ends;

wherein each of said lines of said first plurality of lines of perforations extends toward the opposite edge; and wherein the starting points of the lines of the first plurality of lines of perforations is between 0.250 and 0.375 inches from the inflation edge.

6. The web of claim 5, wherein the starting point is selected such that each line of the first plurality of lines of perforations clears a cutter that cuts the inflation edge to open the pouches for inflation.

7. The web of claim 5, wherein the starting point is selected such that web between the starting point and the inflation edge breaks upon pulling adjacent dunnage units apart.

8. The web of claim 5, wherein the starting point is selected such that the first plurality of lines of perforations clears a blunt surface that separates the first and second elongated layers proximate the inflation edge to open the pouches for inflation.

9. A web for forming dunnage units, comprising:

a first elongated layer;

a second elongated layer superposed over the first elongated layer, the first and second layers connected together at an inflation edge and an opposite edge; and a plurality of seals, each of said seals extending from the opposite edge to a seal end that is a first distance from the inflation edge, such that a plurality of inflatable pouches are bounded by the first elongated layer, the second elongated layer, the opposite edge, the inflation edge, and the seal ends;

wherein sides of the inflatable pouches are defined by edges of said plurality of seals; and a pocket having a single continuous weakened portion extending along the inflation edge from at least one seal to at least one next seal, wherein the single continuous weakened portion comprises a single line of inflation edge perforations connecting the first elongated layer to the second elongated layer, wherein the pocket is bounded by the first and second elongated layers, the inflation edge, and the seal ends, and wherein the weakened portion of the pocket breaks open proximate the inflation edge to open the pouches for inflation.

* * * * *